(12) United States Patent
Miyamoto et al.

(10) Patent No.: US 11,283,950 B2
(45) Date of Patent: Mar. 22, 2022

(54) RECORDING APPARATUS AND OPENING/CLOSING APPARATUS THAT INCLUDES A ROTATION REGULATOR WITH A SPRING WHEREIN THE SPRING FORCE CHANGES BASED ON THE CONTACT OR SEPARATION OF A RIB WITH A ROTATION REGULATION MEMBER WHEN A PART OF THE APPARATUS CHANGES PIVOTING

(71) Applicant: SEIKO EPSON CORPORATION, Tokyo (JP)

(72) Inventors: Shintaro Miyamoto, Shiojiri (JP); Sho Aruga, Chino (JP); Yuka Shimizu, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/936,695

(22) Filed: Jul. 23, 2020

(65) Prior Publication Data

US 2021/0029261 A1 Jan. 28, 2021

(30) Foreign Application Priority Data

Jul. 26, 2019 (JP) .............................. JP2019-137528
Nov. 25, 2019 (JP) .............................. JP2019-212577

(51) Int. Cl.
*H04N 1/00* (2006.01)
*G06F 3/12* (2006.01)

(52) U.S. Cl.
CPC ..... *H04N 1/00554* (2013.01); *H04N 1/00559* (2013.01); *H04N 1/00564* (2013.01)

(58) Field of Classification Search
CPC .......... H04N 1/00543; H04N 1/00554; H04N 1/00557; H04N 1/00559; H04N 1/00564; G03G 21/1628; G03G 21/1633
(Continued)

(56) References Cited

U.S. PATENT DOCUMENTS

2008/0049068 A1* 2/2008 Saito .................. H04N 1/00543
347/37
2015/0160601 A1 6/2015 Namba
(Continued)

FOREIGN PATENT DOCUMENTS

JP 2015-115617 6/2015
JP 2017-149083 8/2017
(Continued)

*Primary Examiner* — Chad Dickerson
(74) *Attorney, Agent, or Firm* — Workman Nydegger

(57) ABSTRACT

A recording apparatus includes a recording unit and a document reading unit. The recording unit includes a shaft, and the document reading unit includes a groove forming member. In the groove, an elastically deformable portion configured to make the width of the groove narrower than a maximum diameter of the shaft The shaft has a shape in which a radial dimension changes along a circumferential direction and is provided so as to rotate, and when the elastically deformable portion passes through the shaft in the process of opening the document reading unit from the closed state, the rotation of the shaft is regulated such that the radial dimension of the shaft with respect to the width of the groove is equal to or less than a first dimension smaller than the maximum dimension.

9 Claims, 21 Drawing Sheets

(58) Field of Classification Search
USPC ................................................ 358/474, 505
See application file for complete search history.

(56) References Cited

U.S. PATENT DOCUMENTS

2018/0034989 A1* 2/2018 Fujibayashi ....... G03G 21/1633
2019/0052766 A1* 2/2019 Ishihara ............. H04N 1/00615

FOREIGN PATENT DOCUMENTS

| | | | |
|---|---|---|---|
| JP | 2017226085 A | * | 12/2017 |
| JP | 2018-019341 | | 2/2018 |
| JP | 2019-031029 | | 2/2019 |

* cited by examiner

FIG. 14
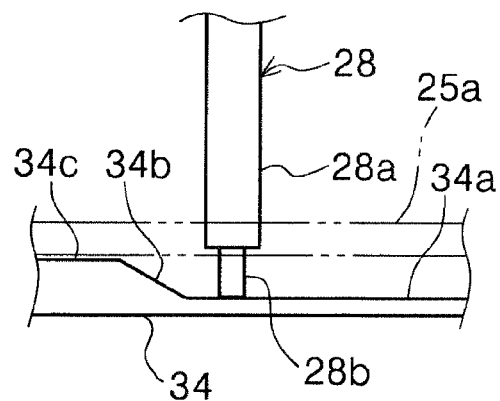
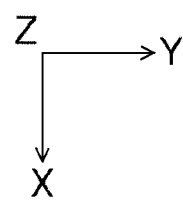
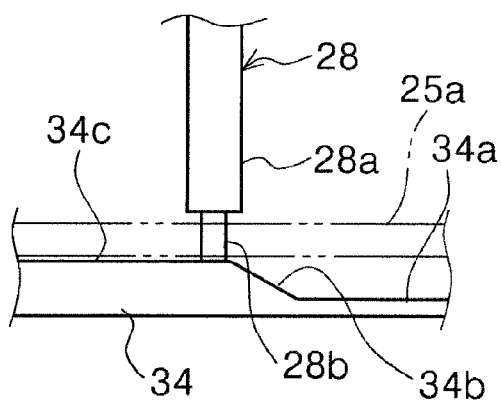

RECORDING APPARATUS AND OPENING/CLOSING APPARATUS THAT INCLUDES A ROTATION REGULATOR WITH A SPRING WHEREIN THE SPRING FORCE CHANGES BASED ON THE CONTACT OR SEPARATION OF A RIB WITH A ROTATION REGULATION MEMBER WHEN A PART OF THE APPARATUS CHANGES PIVOTING

The present application is based on, and claims priority from JP Application Serial Number 2019-137528, filed Jul. 26, 2019 and JP Application Serial Number 2019-212577, filed Nov. 25, 2019, the disclosures of which are hereby incorporated by reference herein in their entirety.

BACKGROUND

1. Technical Field

The present disclosure relates to a recording apparatus including a document reading unit that reads a document and that is provided above a recording unit that performs recording on a medium. In addition, the present disclosure relates to an opening/closing apparatus including an apparatus main body and an opening/closing body that can be opened and closed with respect to the apparatus main body.

2. Related Art

Some recording apparatuses typified by a printer are provided with a scanner unit on an upper portion of an apparatus main body including a recording portion that performs recording on a medium, and are configured as a multi-function machine including both a recording function for recording on a medium and a reading function for reading a document.

JP-A-2018-19341 describes an example of such a configuration. The image reading and recording apparatus described in JP-A-2018-19341 includes an image reading unit above an image recording unit. The image reading unit is attached to the image recording unit so as to pivot via an opening/closing mechanism.

The opening/closing mechanism holds the image reading unit in an open state. The opening/closing mechanism includes a stay having a cam surface and a rotor, and when the rotor rotates, the rotor is hooked on the cam surface, and the open state of the image reading unit is held.

In the configuration described in JP-A-2018-19341, the rotor rotates and is hooked on the cam surface, and when closing the image reading unit in an open state, it is necessary to slightly lift the image reading unit once and then close the image reading unit in order to unhook the rotor, and the operation is difficult to intuitively understand and is troublesome.

As a configuration for avoiding such a problem, as illustrated in FIG. 21, it is conceivable to adopt a configuration in which a shaft 102, which is simple, is used in place of the rotor, the cam surface is formed in a simple arc shape, an elastically deformable portion 101b is provided on the cam surface, and the cam surface is hooked on the shaft 102 by the elasticity of the elastically deformable portion 101b.

Reference sign 101 denotes a stay, which is attached to the image reading unit. The shaft 102 is attached to the image recording unit, and is inserted into a cam groove 101a formed on the stay 101. A gear portion 101c is formed on an outer peripheral portion of the stay, and the gear portion 101c meshes with a gear 103. Rotational torque of the gear 103 is transmitted to a damper mechanism (not illustrated), and the speed at which the image reading unit closes is reduced.

The upper diagram in FIG. 21 illustrates a state in which the image reading unit is closed, the lower diagram in FIG. 21 illustrates a state in which the image reading unit is open, and the middle diagram in FIG. 21 illustrates a state in which the image reading unit is half-open. From the upper diagram in FIG. 21 illustrating the state in which the image reading unit is closed, when opening the image reading unit, the stay 101 rotates together with the image reading unit, and the shaft 102 relatively moves within the cam groove 101a.

The width of the cam groove 101a becomes narrower at the position of the elastically deformable portion 101b, and when changing from the middle diagram in FIG. 21 to the lower diagram, the shaft 102 deforms the elastically deformable portion 101b and increases a groove width. In the state illustrated in the lower diagram in FIG. 21, the open state of the image reading unit is held by the elastically deformable portion 101b being hooked on the shaft 102.

With the configuration as illustrated in FIG. 21, as in the image reading and recording apparatus described in JP-A-2018-19341, there is no need to temporarily lift the image reading unit slightly when closing the image reading unit in the open state, and the operation becomes intuitively easy to understand and simple.

However, when opening the image reading unit from the closed state, specifically, in the process of changing from the middle diagram in FIG. 21 to the lower diagram, there is a possibility that the shaft 102 is lifted due to insufficient elastic deformation of the elastically deformable portion 101b, that is, the image recording unit is lifted, and the image reading unit cannot be opened properly. Such a problem tends to occur particularly when the image recording unit is reduced in weight.

SUMMARY

According to an aspect of the present disclosure, a recording apparatus includes a recording unit that includes a recording portion that performs recording on a medium, a document reading unit that includes a reader that reads a document and that opens and closes an upper portion of the recording unit by pivoting at an upper portion of the recording unit, and a holder that holds the document reading unit in an open state. The holder includes a shaft provided on one of the recording unit and the document reading unit, and a groove forming member provided on another one of the recording unit and the document reading unit, in the groove forming member, a groove into which the shaft is inserted is formed, and the shaft moves relative to the groove with opening and closing of the document reading unit, in the groove, an elastically deformable portion configured to make a width of the groove narrower than a maximum diameter of the shaft and configured to elastically deform in a direction in which the width of the groove increases, and a holding portion that holds the document reading unit in an open state by holding the shaft by elasticity of the elastically deformable portion are provided, the shaft has a shape whose radial dimension changes along a circumferential direction and is provided so as to rotate, and the recording apparatus includes a rotation regulator that regulates rotation of the shaft such that the radial dimension of the shaft with respect to the width of the groove is equal to or less than a first dimension that is smaller than the maximum diameter when the shaft passes through the elastically deformable portion in a process of opening the document reading unit from a closed state.

BRIEF DESCRIPTION OF THE DRAWINGS

FIG. 14 is a view illustrating another embodiment of the shaft.

DESCRIPTION OF EXEMPLARY EMBODIMENTS

Figure 1:
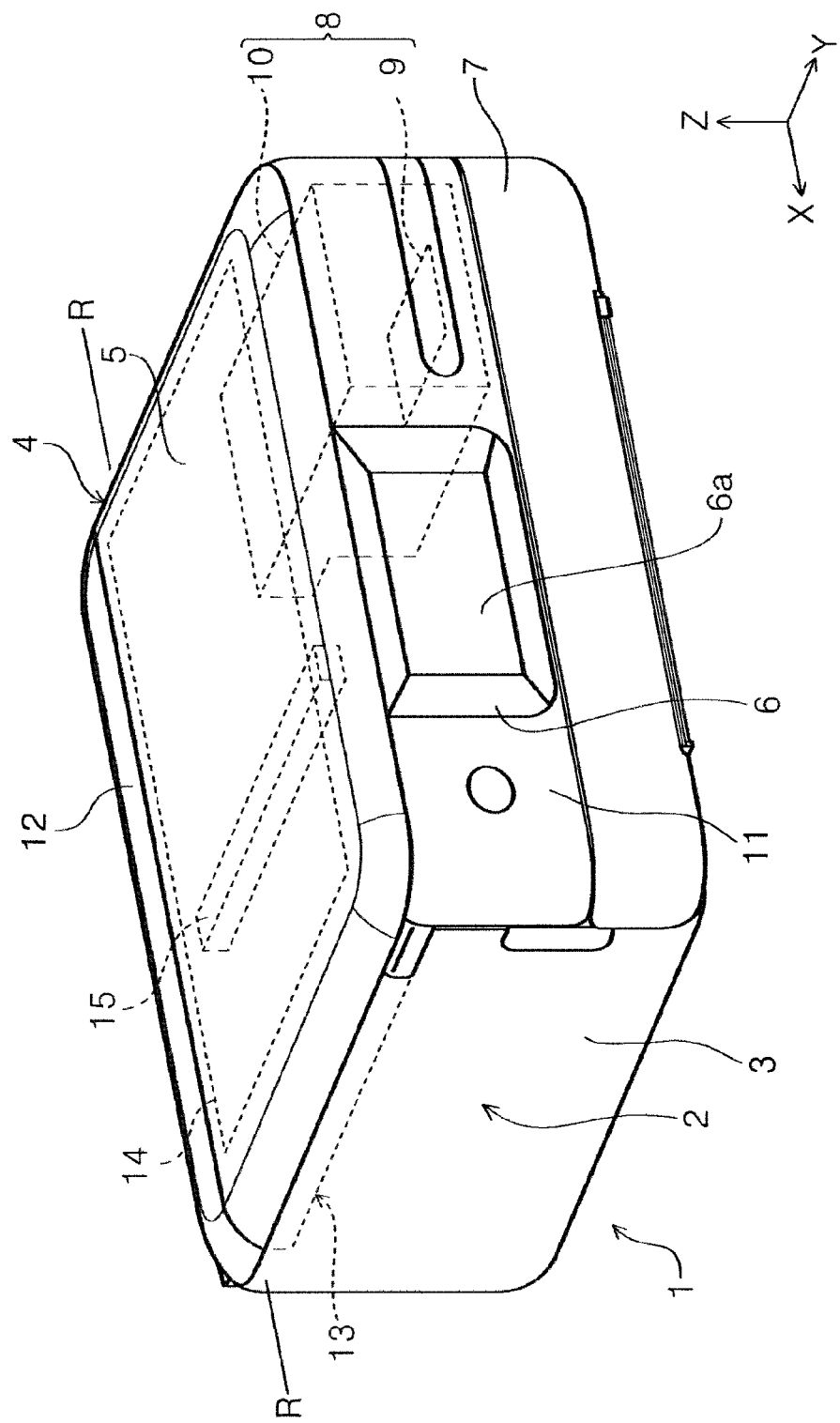
FIG. 1 is an external perspective view of a printer according to a first embodiment.

Hereinafter, the present disclosure will be schematically described.

According to a first aspect of the present disclosure, a recording apparatus includes a recording unit that includes a recording portion that performs recording on a medium, a document reading unit that includes a reader that reads a document and that opens and closes an upper portion of the recording unit by pivoting at an upper portion of the recording unit, and a holder that holds the document reading unit in an open state. The holder includes a shaft provided on one of the recording unit and the document reading unit, and a groove forming member provided on another one of the recording unit and the document reading unit, in the groove forming member, a groove into which the shaft is inserted is formed, and the shaft moves relative to the groove with opening and closing of the document reading unit, in the groove, an elastically deformable portion configured to make a width of the groove narrower than a maximum diameter of the shaft and configured to elastically deform in a direction in which the width of the groove increases, and a holding portion that holds the document reading unit in an open state by holding the shaft by elasticity of the elastically deformable portion are provided, the shaft has a shape whose radial dimension changes along a circumferential direction and is provided so as to rotate, and the recording apparatus includes a rotation regulator that regulates rotation of the shaft such that the radial dimension of the shaft with respect to the width of the groove is equal to or less than a first dimension that is smaller than the maximum diameter when the shaft passes through the elastically deformable portion in a process of opening the document reading unit from a closed state.

According to this aspect, in the configuration in which the open state of the document reading unit is held by the shaft being held by the holding portion by the elasticity of the elastically deformable portion formed in the groove forming member, since there is provided a rotation regulator that regulates rotation of the shaft such that a radial dimension of the shaft with respect to a width of the groove is equal to or less than a first dimension smaller than the maximum diameter when the elastically deformable portion passes through the shaft in the process of opening the document reading unit from the closed state, the load when the elastically deformable portion passes through the shaft is reduced or there is no load, and the likelihood that the shaft, that is, the recording unit is lifted when the document reading unit is opened is reduced.

In a second aspect according to the first aspect, the rotation regulator includes a rotation regulating member attached to the shaft, a rib that is provided on the groove forming member and that switches between a state in which the rib is in contact with the rotation regulating member and a state in which the rib is separated from the rotation regulating member with the pivoting of the document reading unit, and a spring that applies a pressing force to the rotation regulating member in a direction in which the radial dimension of the shaft with respect to the width of the groove in the elastically deformable portion is larger than the first dimension. When the rib is in contact with the rotation regulating member, the radial dimension of the shaft with respect to the width of the groove in the elastically deformable portion is maintained at the first dimension or less against the pressing force of the spring, and when the rib is separated from the rotation regulating member, the shaft is rotated by the pressing force of the spring, and the radial dimension of the shaft with respect to the width of the groove in the elastically deformable portion is larger than the first dimension.

According to this aspect, by configuring the rotation regulator to include the rotation regulating member, the rib, and the spring, the rotation regulator can be configured at a low cost.

In a third aspect according to the second aspect, the rib comes into contact with the rotation regulating member with closing of the document reading unit at a predetermined angle from a state in which the shaft is held by the holding portion.

According to this aspect, because the rib comes into contact with the rotation regulating member with closing of the document reading unit at a predetermined angle from a state in which the shaft is held by the holding portion, immediately after the shaft passes through the holding portion, the radial dimension of the shaft with respect to the width of the groove does not decrease, and the open state of the document reading unit can be reliably held.

In a fourth aspect according to any one of the first to third aspects, the shaft has a shape in which a portion of a circumference is cut out when viewed from an axis direction, and the radial dimension changes along the circumferential direction.

According to this aspect, since the shaft has a radial dimension that varies along the circumferential direction by forming a shape in which a portion of the circumference is cut out when viewed from the axis direction, an axis whose radial dimension changes along the circumferential direction can be obtained at a low cost with a simple structure.

In a fifth aspect according to any one of the first to fourth aspects, the document reading unit is provided on the recording unit via a first hinge portion provided at one side end portion of the document reading unit and a second hinge portion provided at another side end portion of the document reading unit in a rotation axis direction, the shaft, the groove forming member, and the rotation regulator are provided on a side of the first hinge portion in the rotation axis direction, and a supporter that supports the document reading unit in a state where the document reading unit is open is provided on a side of the second hinge portion in the rotation axis direction.

In a configuration in which the shaft, the groove forming member, and the rotation regulator are provided on the side of the first hinge portion in the rotation axis direction, the document reading unit may descend at the second hinge portion. According to this aspect, since the supporter that supports the document reading unit when the document reading unit is in the open state is provided on the side of the second hinge portion in the rotation axis direction, it is possible to suppress the document reading unit from descending below the second hinge portion.

In a sixth aspect according to the second or third aspect, the document reading unit is provided on the recording unit via a first hinge portion provided at one side end portion of the document reading unit and a second hinge portion provided at another side end portion of the document reading unit in a rotation axis direction, a first holder is provided on a side of the first hinge portion as the holder, and a second holder is provided on a side of the second hinge portion as the holder.

According to this aspect, since the holder is provided for both the first hinge portion and the second hinge portion, when the document reading unit is opened, it is possible to suppress the document reading unit from descending below the first hinge portion or the second hinge portion.

In a seventh aspect according to the sixth aspect, at least one of the first holder and the second holder is provided with a damper that attenuates a speed at which the document reading unit closes.

According to this aspect, since at least one of the first holder and the second holder is provided with a damper that attenuates a speed at which the document reading unit closes, even if the user releases his or her hand when closing the document reading unit, the likelihood that the document reading unit closes vigorously and a loud collision sound is generated or the document reading unit is damaged can be suppressed.

In an eighth aspect according to the sixth or seventh aspect, the holder includes a contact portion provided on the rotation regulating member, and a regulating portion that regulates rotation of the rotation regulating member upon contact with the contact portion, and, in a state in which the shaft entered the holding portion, the contact portion is pressed against the regulating portion by the pressing force of the spring, in the groove forming member included in the first holder, a first groove is formed as the groove, in the groove forming member included in the second holder, a second groove is formed as the groove, and, when opening the document reading unit, a timing at which the shaft enters the holding portion formed in the second groove is earlier than a timing at which the shaft enters the holding portion formed in the first groove, and, out of the first holder and the second holder, the regulating portion provided in the second holder is formed of an elastic material that reduces a contact sound upon contact with the contact portion.

The holder is configured such that when the shaft enters the holding portion, the contact portion provided on the rotation regulating member contacts the regulating portion by the pressing force of the spring, and since the rotation regulating member is configured to stop rotating, a contact sound is generated when the contact portion contacts the regulating portion, therefore, the user can determine that the document reading unit has been held in the open state by the contact sound.

Here, when opening the document reading unit, in a case in which a difference occurs between the timing at which the contact sound is generated in the first holder and the timing at which the contact sound is generated in the second holder, the user stops the operation of opening the document reading unit at the timing when the contact sound first occurs, and, as a result, there is a possibility that one of the first holder and the second holder cannot shift to the holding state, and in this case, the document reading unit may descend on the side not shifted to the holding state. Further, the holding state refers to a state in which the shaft enters the holding portion.

However, in this aspect, since, when opening the document reading unit, the timing at which the shaft enters the holding portion formed in the second groove is earlier than the timing at which the shaft enters the holding portion formed in the first groove, and, out of the first holder and the second holder, the regulating portion provided in the second holder is formed of an elastic material that reduces a contact sound upon contact with the contact portion, and since the second holder is in a holding state prior to the first holder, and at that time, the contact sound is unlikely to occur, it can be expected that the user will continue the operation of opening the document reading unit. Then, when the first holder is in a holding state, the contact sound is easily generated, and when the user stops the operation of opening the document reading unit due to the contact sound, both the first holder and the second holder are in the holding state. As described above, it is possible to suppress the user from stopping the operation of opening the document reading unit without one of the first holder and the second holder shifting to the holding state, and, as a result, both the first holder and the second holder can be appropriately shifted to the holding state.

In a ninth aspect according to the eighth aspect, the document reading unit includes an operation panel near the second hinge portion in the rotation axis direction.

In the configuration in which the document reading unit includes an operation panel near the second hinge portion in the rotation axis direction, when opening the document reading unit, the side on which the operation panel is provided descends due to weight, and the first holder is likely to be in a holding state prior to the second holder, and this makes it easy to stop the operation of opening the document reading unit without the second holding portion shifting to the holding state. However, with the operation and effect of the eighth aspect described above, occurrence of such a problem can be suppressed.

An opening/closing apparatus according to a tenth aspect includes an apparatus main body, an opening/closing body that opens and closes an upper portion of the apparatus main body by pivoting at an upper portion of the apparatus main body, and a holder that holds the opening/closing body in an open state. The holder includes a shaft provided on one of the apparatus main body and the opening/closing body, and a groove forming member provided on another one of the apparatus main body and the opening/closing body, in the groove forming member, a groove into which the shaft is inserted is formed, and the shaft moves relative to the groove with opening and closing of the opening/closing body, in the groove, an elastically deformable portion configured to make a width of the groove narrower than a maximum diameter of the shaft and configured to elastically deform in a direction in which the width of the groove increases, and a holding portion that holds the opening/closing body in an open state by holding the shaft by elasticity of the elastically deformable portion are provided, the shaft has a shape whose radial dimension changes along a circumferential direction and is provided so as to rotate, and the opening/closing apparatus includes a rotation regulator that regulates rotation of the shaft such that the radial dimension of the shaft with respect to the width of the groove is equal to or less than a first dimension smaller than the maximum diameter when the shaft passes through the elastically deformable portion in a process of opening the opening/closing body from a closed state.

According to this aspect, in the configuration in which the shaft is held by the holding portion by the elasticity of the elastically deformable portion formed in the groove forming member, whereby the opening/closing body is held open, when the elastically deformable portion passes through the shaft in the process of opening from the closed state of the opening/closing body, since there is provided a rotation regulator that regulates rotation of the shaft such that a radial dimension of the shaft with respect to a width of the groove is equal to or less than a first dimension smaller than the maximum diameter, the load when the elastically deformable portion passes through the shaft is reduced or the load is eliminated, and the likelihood that the shaft, that is, the recording unit, is lifted when opening the opening/closing body is reduced.

Hereinafter, the present disclosure will be specifically described.

First Embodiment

In a first embodiment, an ink jet printer 1 will be described as an example of a recording apparatus.

Hereinafter, the ink jet printer 1 will simply be referred to as a printer 1.

Further, in the XYZ coordinate system illustrated in each figure, the X-axis direction indicates the apparatus width direction, the Y-axis direction indicates the apparatus depth direction, and the Z-axis direction indicates the apparatus height direction. In addition, the +Y direction is a direction from the rear of the apparatus to the front, and the −Y direction is a direction from the front of the apparatus to the rear. In addition, when viewed from the front of the apparatus, the left is the +X direction and the right is the −X direction. In addition, the +Z direction is an upper side, and the −Z direction side is a lower side.

In addition, the transport direction in which the medium is transported in the printer 1 is referred to as "downstream", and the opposite direction is referred to as "upstream".

The printer 1 illustrated in FIG. 1 includes a recording unit 2 as an apparatus main body, which includes therein a recording portion 8 that performs recording on a medium, and a scanner unit 4 that is provided above the recording unit 2 and that serves as a document reading unit that reads a document image. That is, the printer 1 is configured as a multi-function machine having an image reading function in addition to a recording function. An example of the medium is a recording sheet.

In the printer 1, the recording portion 8 includes a recording head 9 that ejects ink as a liquid, and a carriage 10 that supports the recording head 9, and performs recording by discharging ink from the recording head 9 toward a medium. The carriage 10 reciprocates in the X-axis direction under the power of a motor (not illustrated).

The outer frame of the recording unit 2 is constituted by a housing 3. A feed port cover 12 is provided at the rear of the recording unit 2 so as to be openable and closable, and by opening the feed port cover 12, a medium feed port (not illustrated) is exposed.

Figure 2:
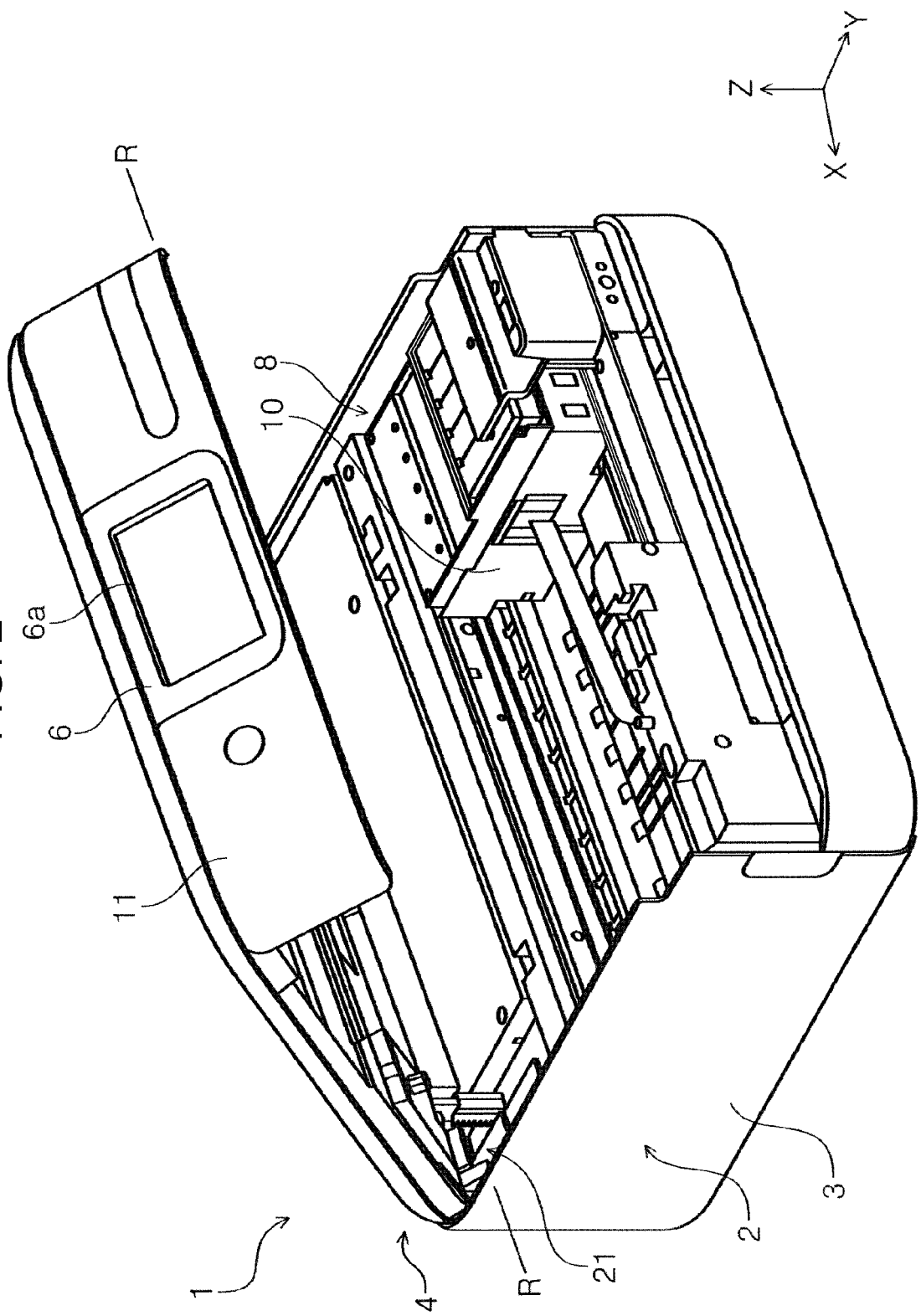
FIG. 2 is an external perspective view of the printer with a scanner unit in an open state.

The scanner unit 4 is provided above the recording unit 2. The scanner unit 4 has a pivot shaft (not illustrated) that pivots toward the apparatus rear, that is, in the −Y direction, and pivots with the apparatus front, that is, in the +Y direction as the free end, so that the upper portion of the recording unit 2 can be opened and closed. In FIGS. 1 and 2, a straight line R indicates a rotation axis of the scanner unit 4. The straight line R is a straight line parallel to the X axis. FIG. 1 illustrates a closed state in which the scanner unit 4 is closed with respect to the recording unit 2, and FIG. 2 illustrates a state in which the scanner unit 4 is completely open with respect to the recording unit 2.

The scanner unit 4 includes a scanner body 13 having a reading sensor 15 therein as a reader that reads a document, a document table 14 on which a document is set, and a document table cover 5 that can open and close the document table 14. The reading sensor 15 extends in the Y-axis direction, and moves in the X-axis direction by receiving the motive power of a motor (not illustrated).

Next, a panel unit 11 including an operation portion 6 is provided in the scanner unit 4 in the +Y direction, which is the front of the printer 1. The operation portion 6 can perform various setting operations and execution operations for recording and image reading, as well as preview display of setting content and images.

A lower cover 7 is provided at a lower portion of the front surface of the recording unit 2. The lower cover 7 is provided to be openable and closable, and when opened, exposes a medium tray (not illustrated) that stores a medium before recording and a discharge tray (not illustrated) that receives a medium discharged after recording.

The schematic configuration of the printer 1 has been described above, and hereinafter, a holder 23 that holds the scanner unit 4 in the open state will be described with reference to FIG. 3.

Figure 12:
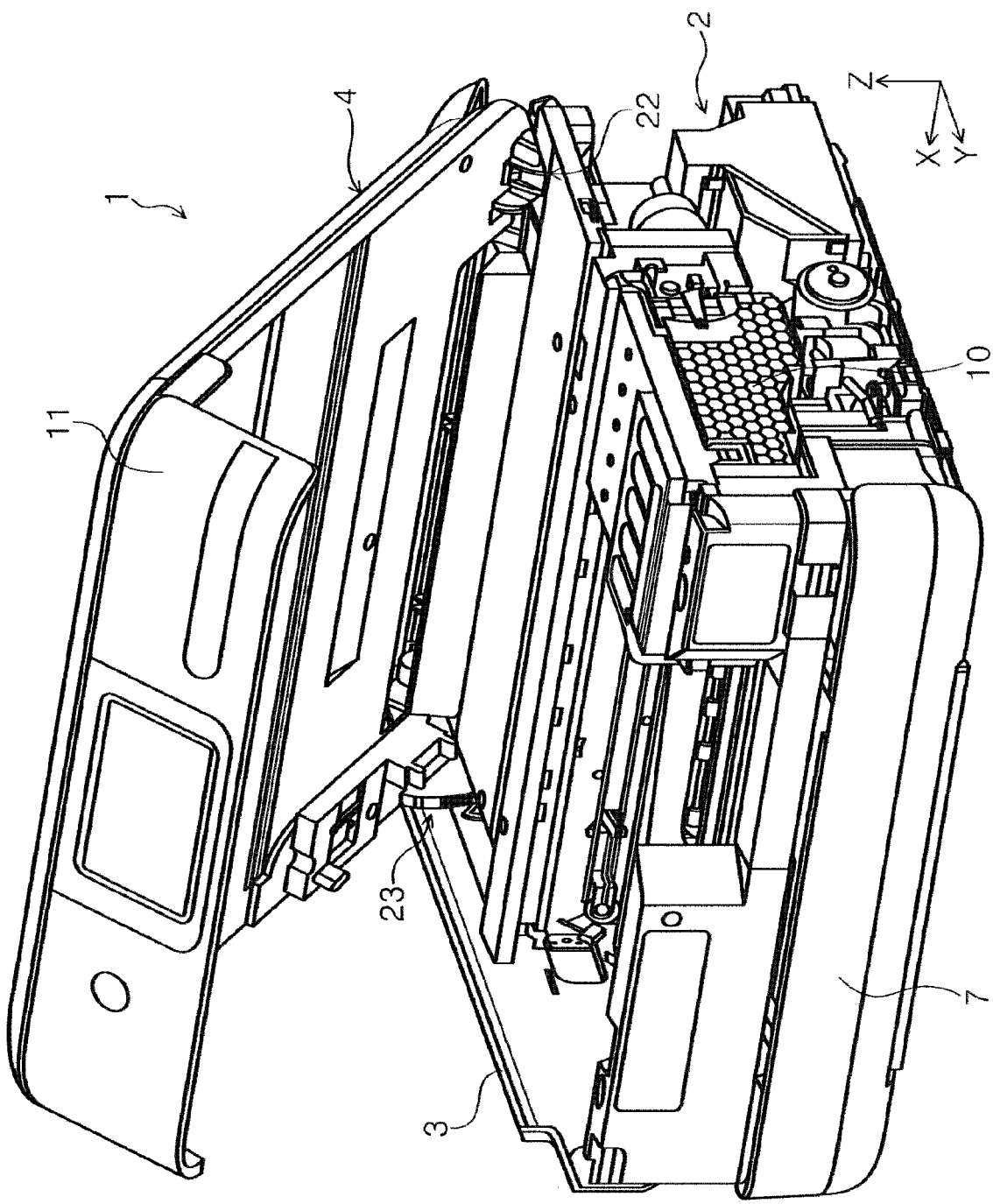
FIG. 12 is an external perspective view of the inside of the printer with the scanner unit in the open state.
Figure 13:
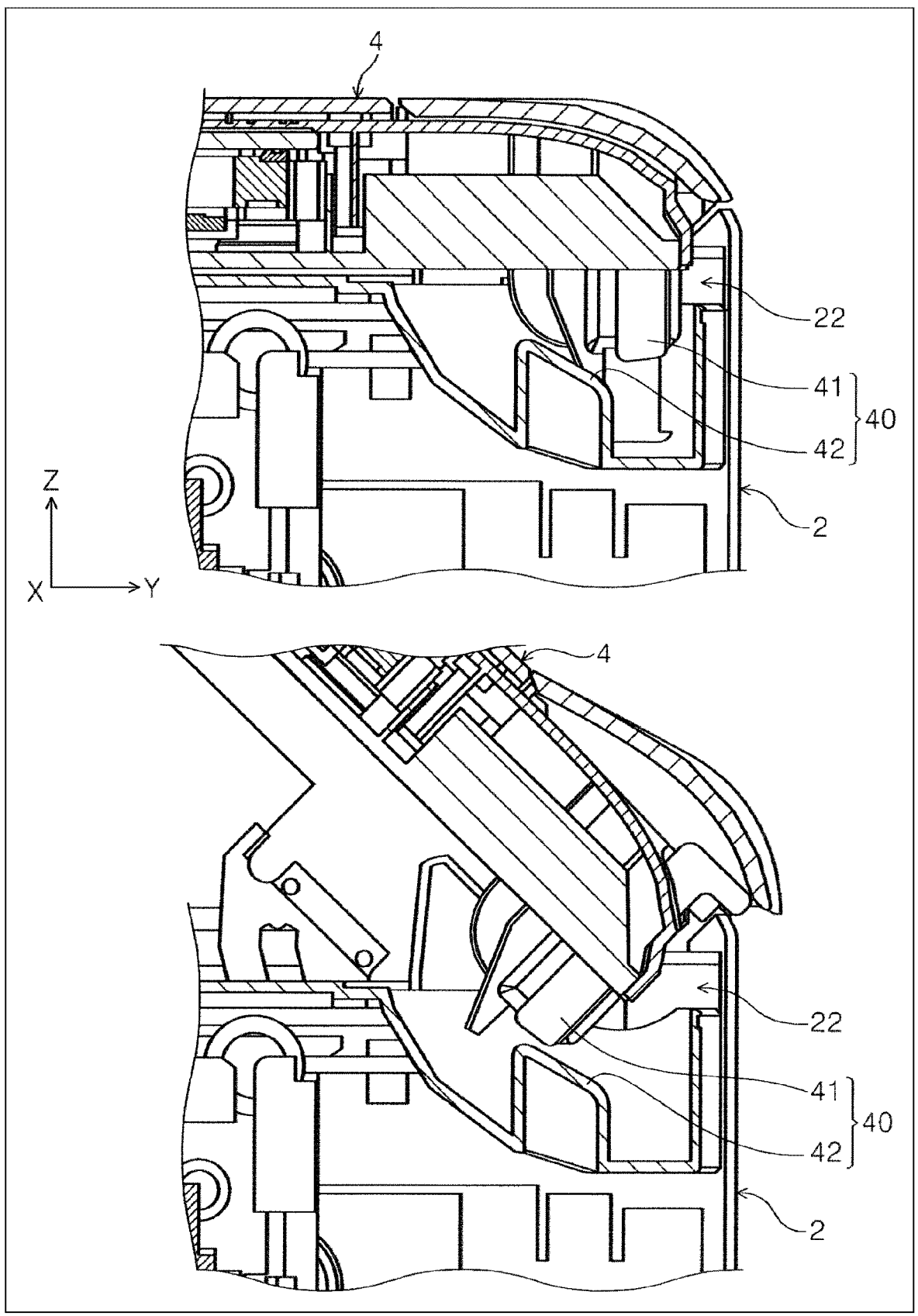
FIG. 13 has an upper diagram illustrating a sectional view of the vicinity of a second hinge portion with the scanner unit in a closed state, and the lower diagram is a sectional view of the vicinity of the second hinge portion with the scanner unit in an open state.

The scanner unit 4 is provided in the recording unit 2 via a first hinge portion 21 (refer to FIGS. 2 and 3) provided on the +X side in a direction of the rotation axis R, that is, an X axis direction, and a second hinge portion 22 (refer to FIG. 12) provided in the −X direction.

Figure 3:
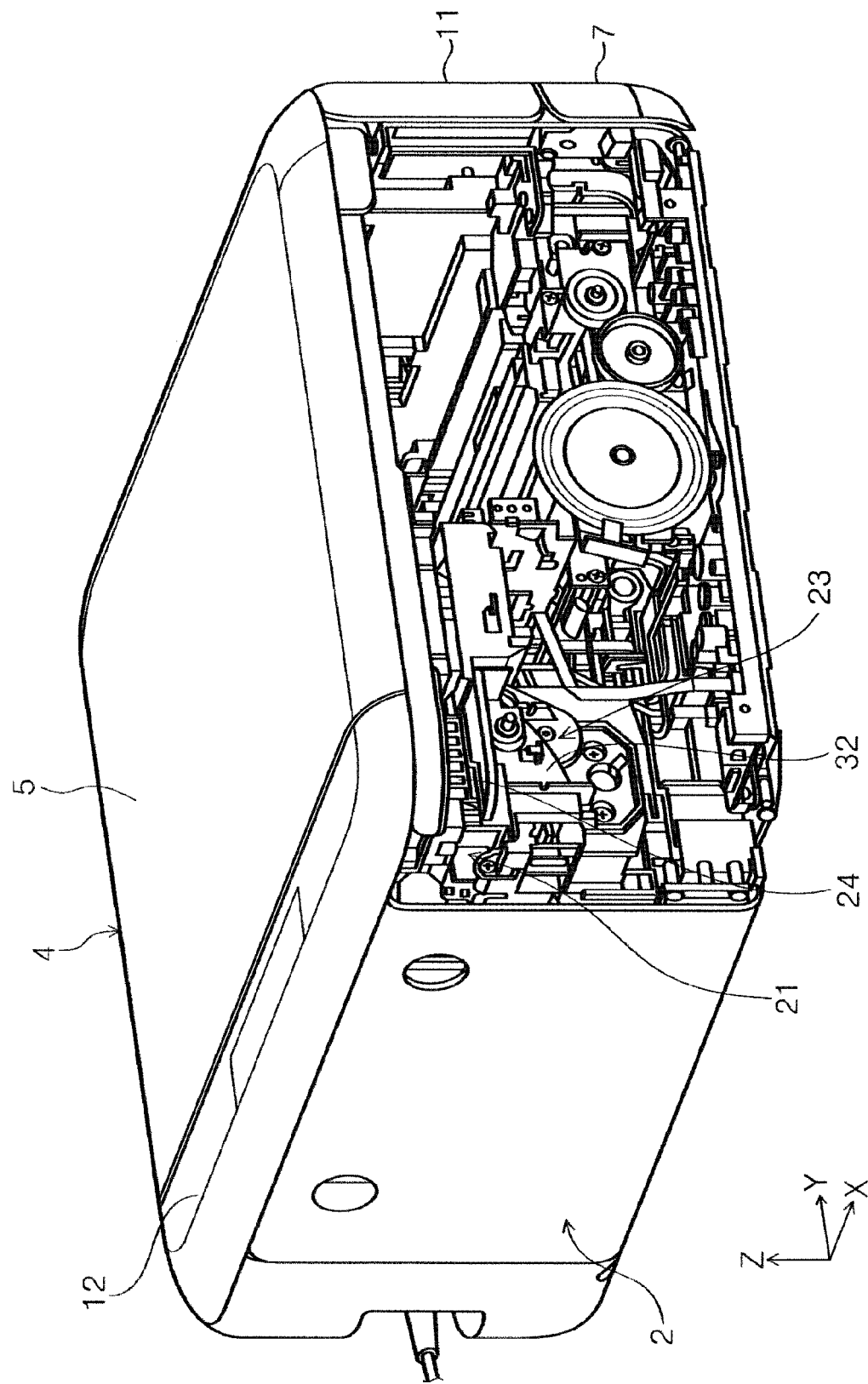
FIG. 3 is an external perspective view of the inside of the printer.
Figure 4:
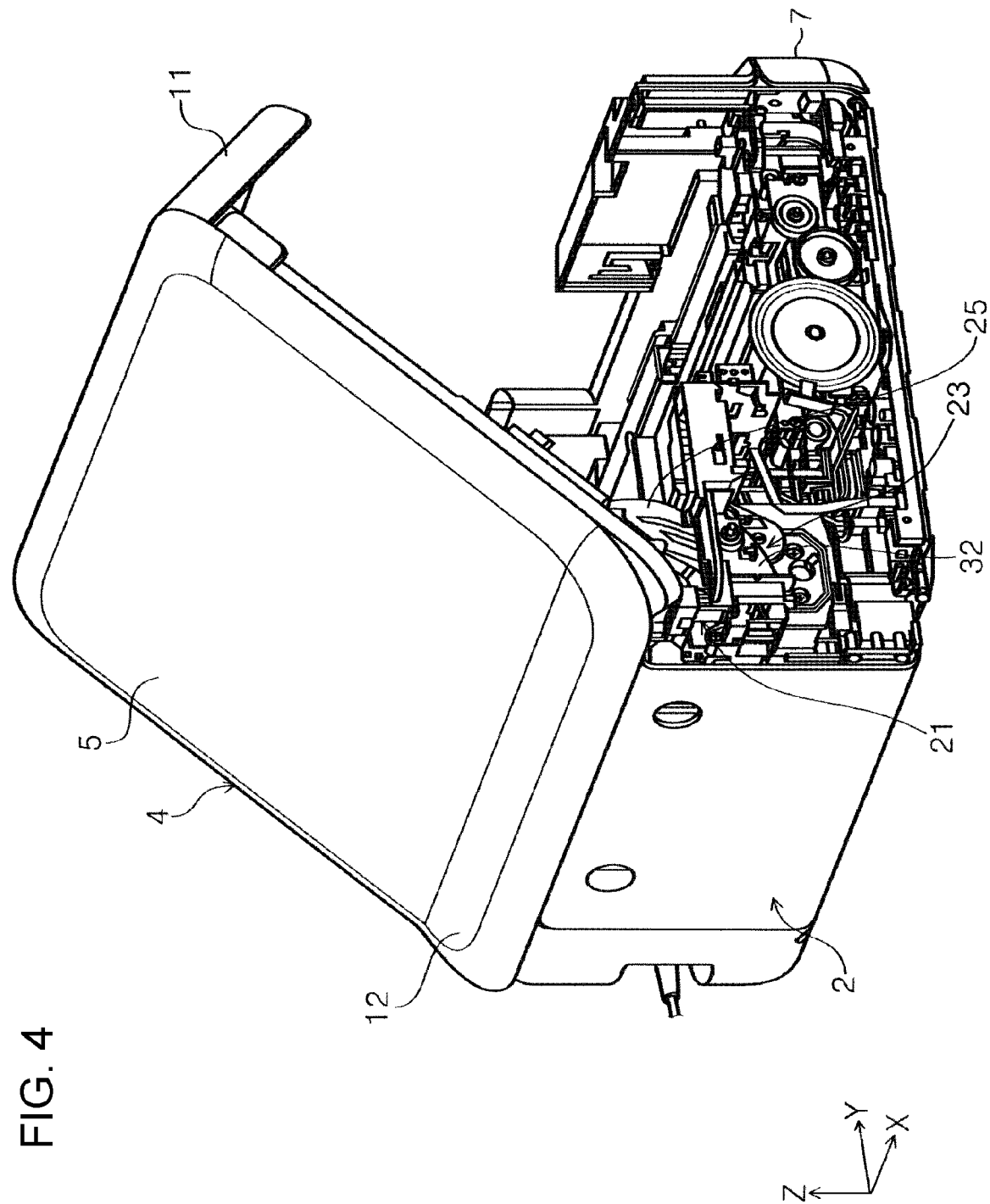
FIG. 4 is an external perspective view of the inside of the printer with the scanner unit in the open state.
Figure 5:
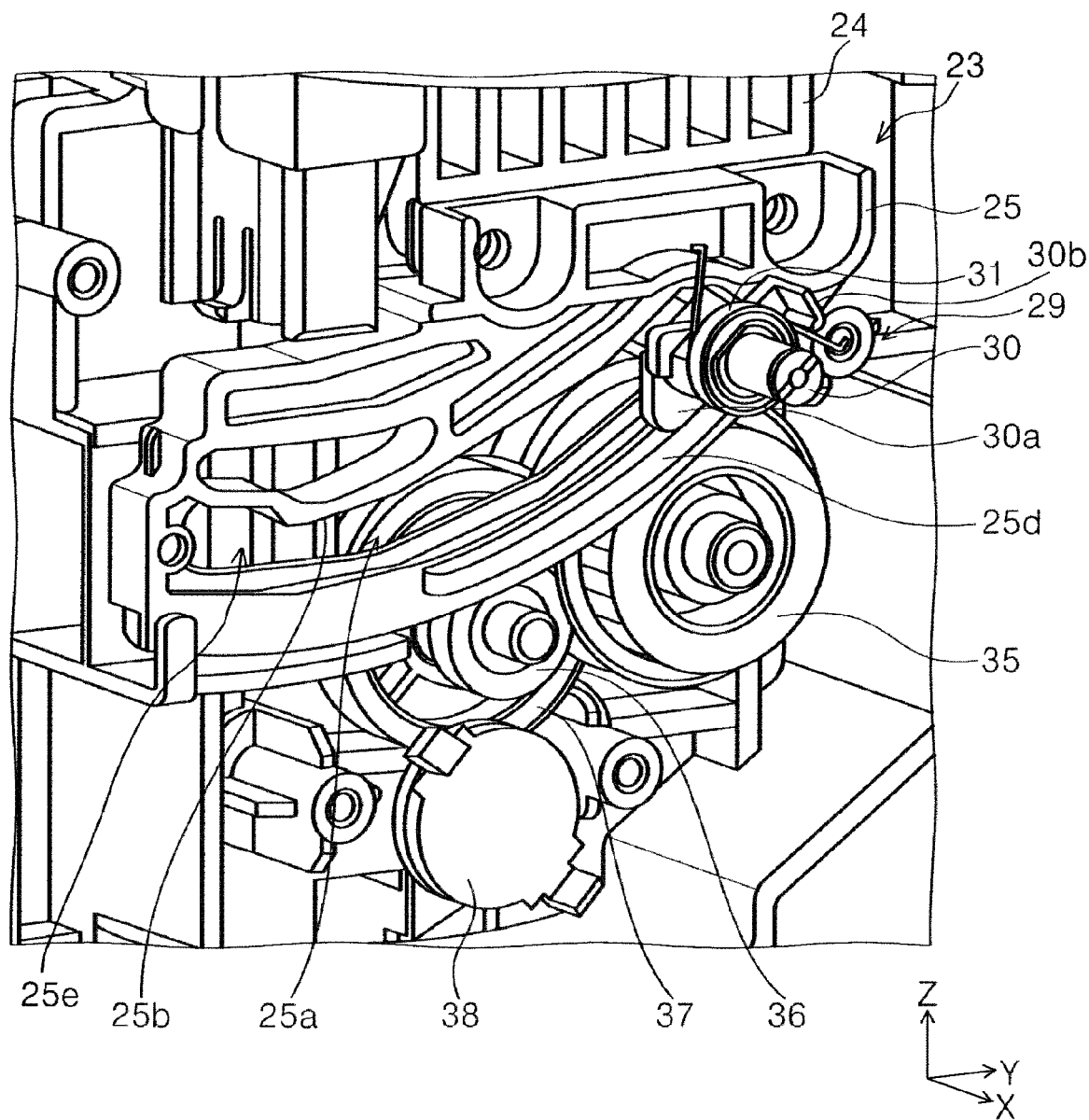
FIG. 5 is a perspective view of a peripheral configuration of a groove forming member.

As illustrated in FIGS. 3 to 5, the holder 23 that holds the scanner unit 4 in an open state is provided on the first hinge portion 21 side. More specifically, as illustrated in FIG. 3, the scanner unit 4 is provided with an attachment portion 24, and, as illustrated in FIG. 4, the attachment portion 24 is provided with a groove forming member 25. A guide member 32 that guides a rotation regulating member 30 described later is provided in the +X direction with respect to the groove forming member 25. FIGS. 5 to 11 illustrate a state where the guide member 32 has been removed. In addition, FIGS. 6 and 11, and FIGS. 7 to 10 illustrate a state in which the rotation regulating member 30 is also removed.

Figure 6:
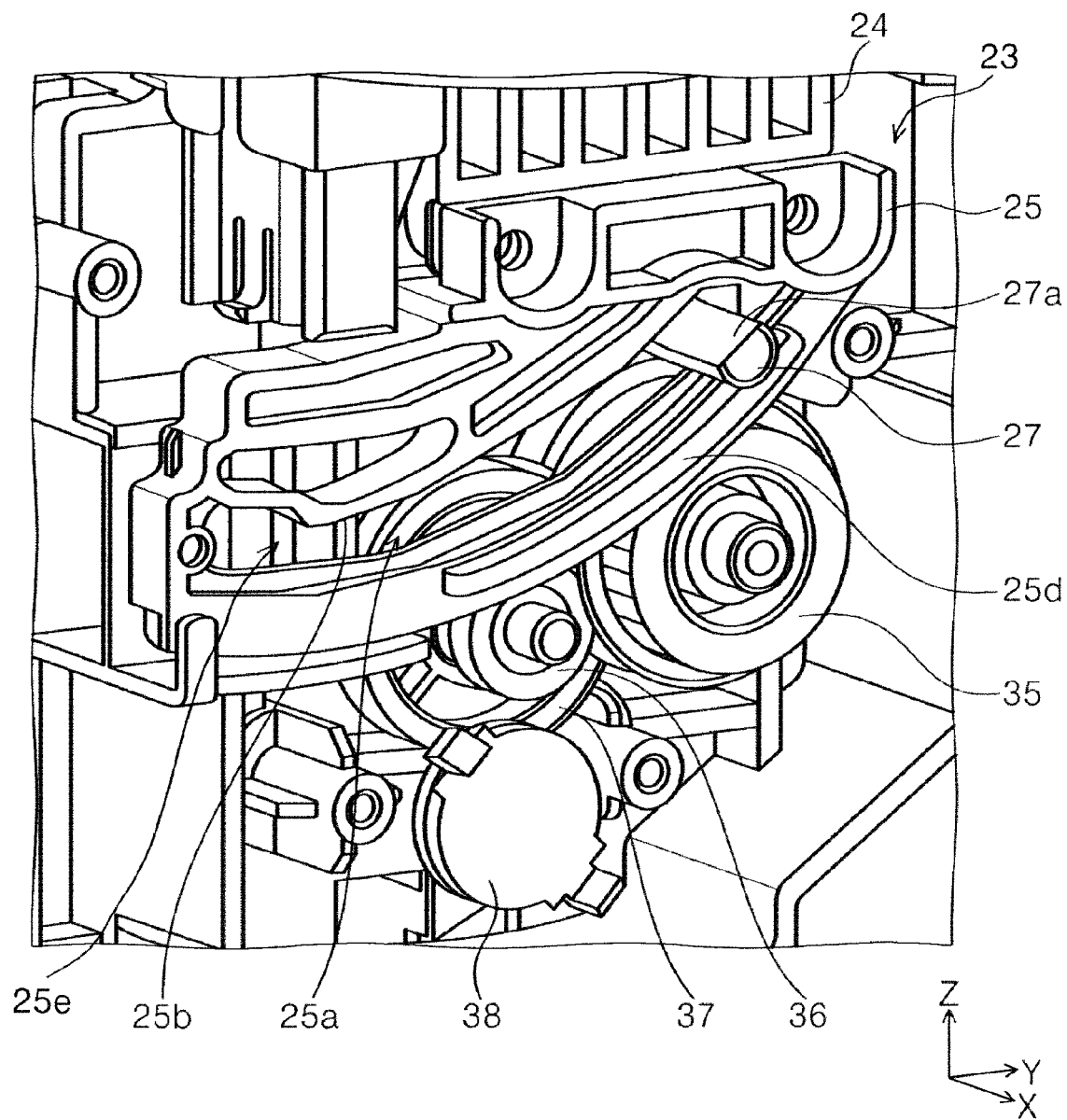
FIG. 6 is a perspective view of the peripheral configuration of the groove forming member.

In FIGS. 5 and 6, a groove 25a is formed in the groove forming member 25. The groove 25a extends in a circumferential direction around a rotation axis R (refer to FIG. 1). The groove forming member 25 rotates about the rotation axis R together with the scanner unit 4.

Figure 10:
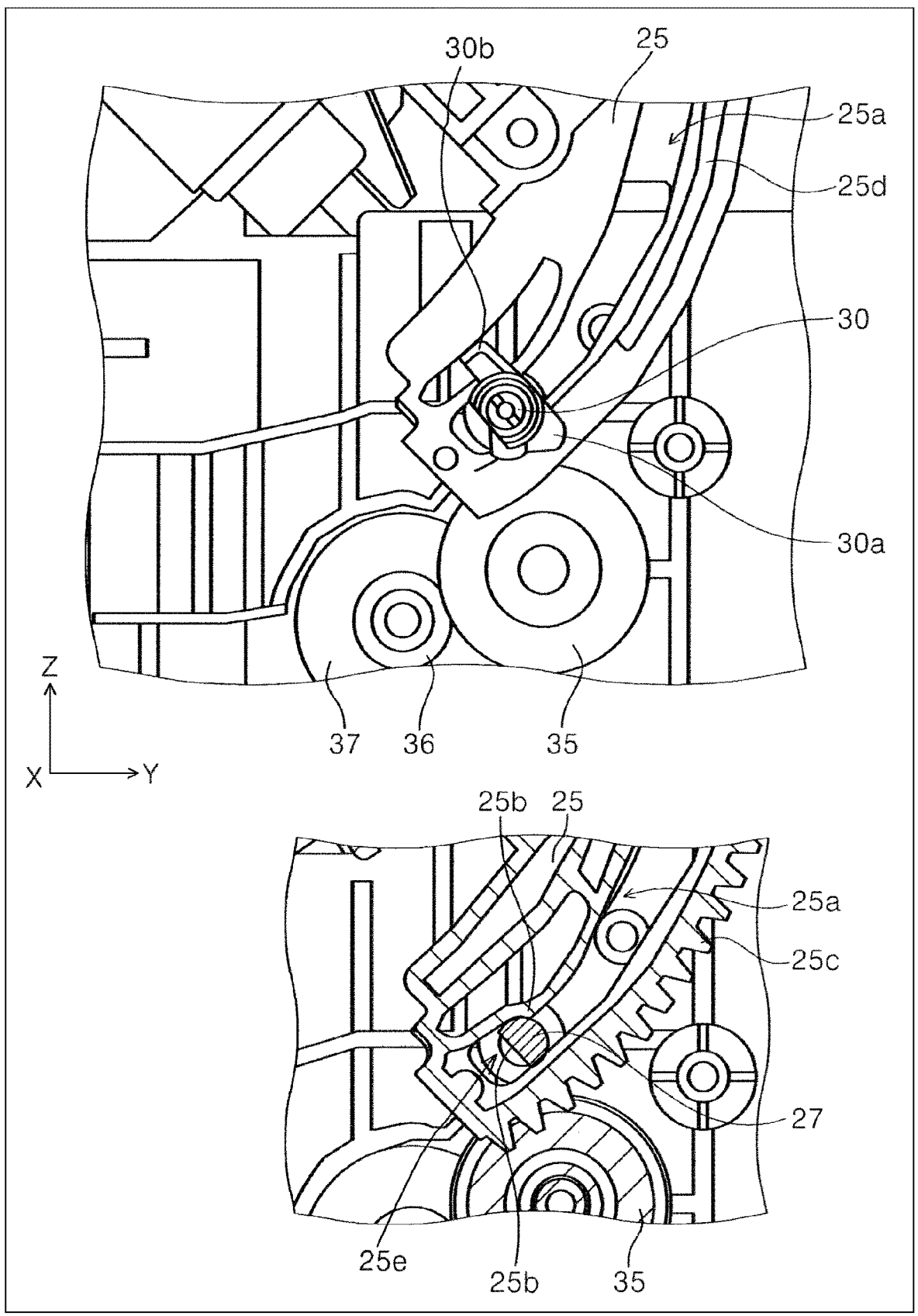
FIG. 10 has an upper diagram illustrating a front view of the groove forming member, and a lower diagram illustrating a sectional view of the groove forming member and the shaft.

The recording unit 2 is provided with a shaft 27, and the shaft 27 enters the groove 25a. The groove 25a is provided with an elastically deformable portion 25b which is elastically deformable in a direction in which the groove width of the groove 25a increases, and a holding portion 25e that holds the shaft 27 by elasticity of the elastically deformable portion 25b to hold the scanner unit 4 in an open state. When the scanner unit 4 is in an open state, the shaft 27 enters the holding portion 25e as illustrated in FIG. 10, and the elastically deformable portion 25b is hooked on the shaft 27, so that the scanner unit 4 is held in the open state.

The groove forming member 25 and the shaft 27 constitute the holder 23.

Figure 11:
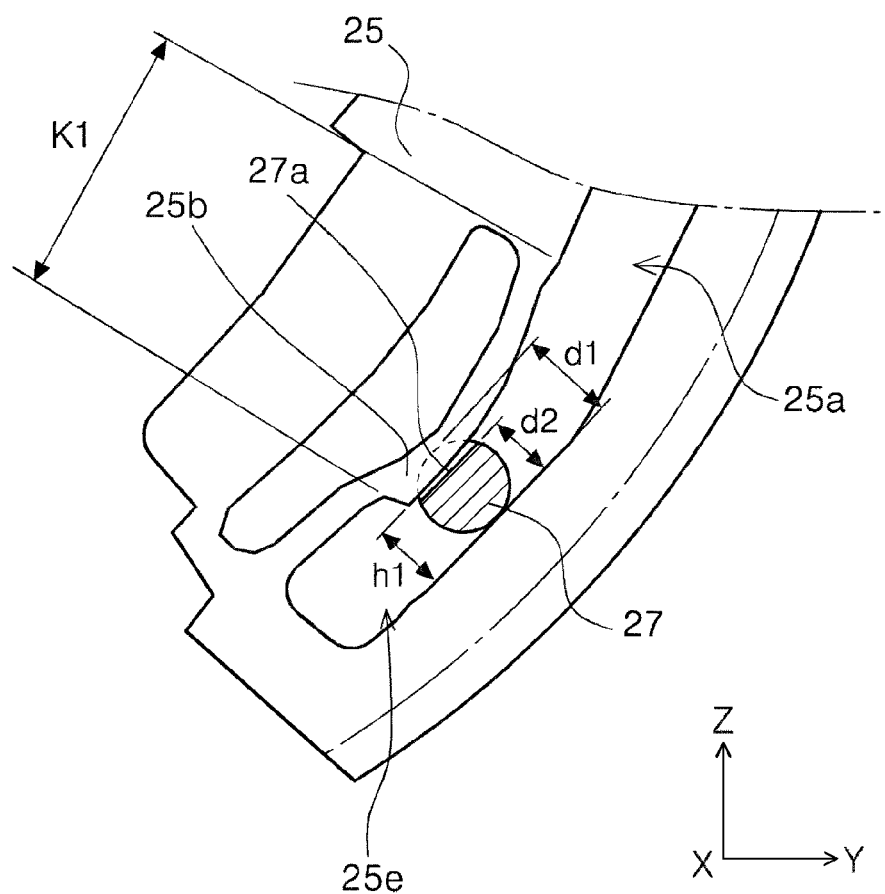
FIG. 11 is a diagram illustrating a relationship between a groove width and a shaft diameter.

In FIG. 11, reference sign h1 denotes a minimum width of the groove 25a at the position of the elastically deformable portion 25b, and reference sign d1 denotes a maximum diameter of the shaft 27. The maximum diameter d1 of the shaft 27 is larger than the minimum width h1 of the groove 25a, and, when the scanner unit 4 is in an open state, as illustrated in the lower diagram in FIG. 10, the elastically deformable portion 25b is hooked on the shaft 27, and the open state of the scanner unit 4 is held. The elastically deformable portion 25b is elastically deformable in the width direction of the groove 25a, and when the scanner unit 4 is closed from the state in FIG. 10, the width of the groove 25a is expanded by elastic deformation of the elastically deformable portion 25b, and the elastically deformable portion 25b can pass through the position of the shaft 27 as illustrated in the change from FIG. 10 to FIG. 9. When closing the scanner unit 4 from the open state, the state changes in the order of FIG. 10, FIG. 9, FIG. 8, and FIG. 7.

A gear portion 25c (refer to the lower diagrams in FIGS. 7 to 10) is formed on the outer peripheral portion of the groove forming member 25, and the gear portion 25c meshes with a gear 35. The rotational torque of the gear 35 is transmitted to a damper 38 via gears 36 and 37, and the speed at which the scanner unit 4 is closed is reduced by the damper 38.

When the scanner unit 4 is opened from the closed state, the state changes in the order of FIG. 7, FIG. 8, FIG. 9, and FIG. 10. Here, in the process of changing from FIG. 9 to FIG. 10, when the elastically deformable portion 25b passes through the maximum diameter of the shaft 27, there is insufficient elastic deformation of the elastically deformable portion 25b and the shaft 27 is lifted, that is, the recording unit 2 may be lifted, and the scanner unit 4 may not open properly. Such a problem is likely to occur particularly when the recording unit 2 is reduced in weight. Therefore, in the present embodiment, the following configuration is employed.

The shaft 27 extends in the X-axis direction, a center axis thereof is parallel to the X-axis direction, and the shaft 27 is provided so as to be rotatable around the center axis. The shaft 27 has a portion in the axis direction, specifically, a portion passing through the groove 25a, and has a shape in which a portion of the circumference is cut out as illustrated in FIG. 11, and a portion having a diameter d2 smaller than the maximum diameter d1 is formed.

Since the radial dimension of the shaft 27 changes along the circumferential direction by forming a shape in which a portion of the circumference is cut out when viewed from the axis direction, a simple structure in which an axis whose radial dimension changes along the circumferential direction can be obtained at a low cost.

Further, the shaft 27 has a D shape when viewed from the axis direction due to a portion of the circumference being cut out; however, the shape is not limited to this, and may be any shape such as an elliptical shape or a track shape as long as the radial dimension changes along the circumferential direction.

Next, the rotation regulating member 30 is fixed to a distal end of the shaft 27. The rotation regulating member 30 includes a first regulating portion 30a, and is provided with a spring force by a spring 31 illustrated in FIG. 5 so as to rotate in a counterclockwise direction in FIGS. 7 to 10. As a result, in a state where no external force other than the spring 31 is acting on the rotation regulating member 30, in particular, in a state where the shaft 27 has entered the holding portion 25e, the shaft 27 is in the state illustrated in FIG. 10, that is, in a state in which the maximum diameter faces the groove width direction of the groove 25a, and the elastically deformable portion 25b is reliably hooked on the shaft 27.

Figure 19:
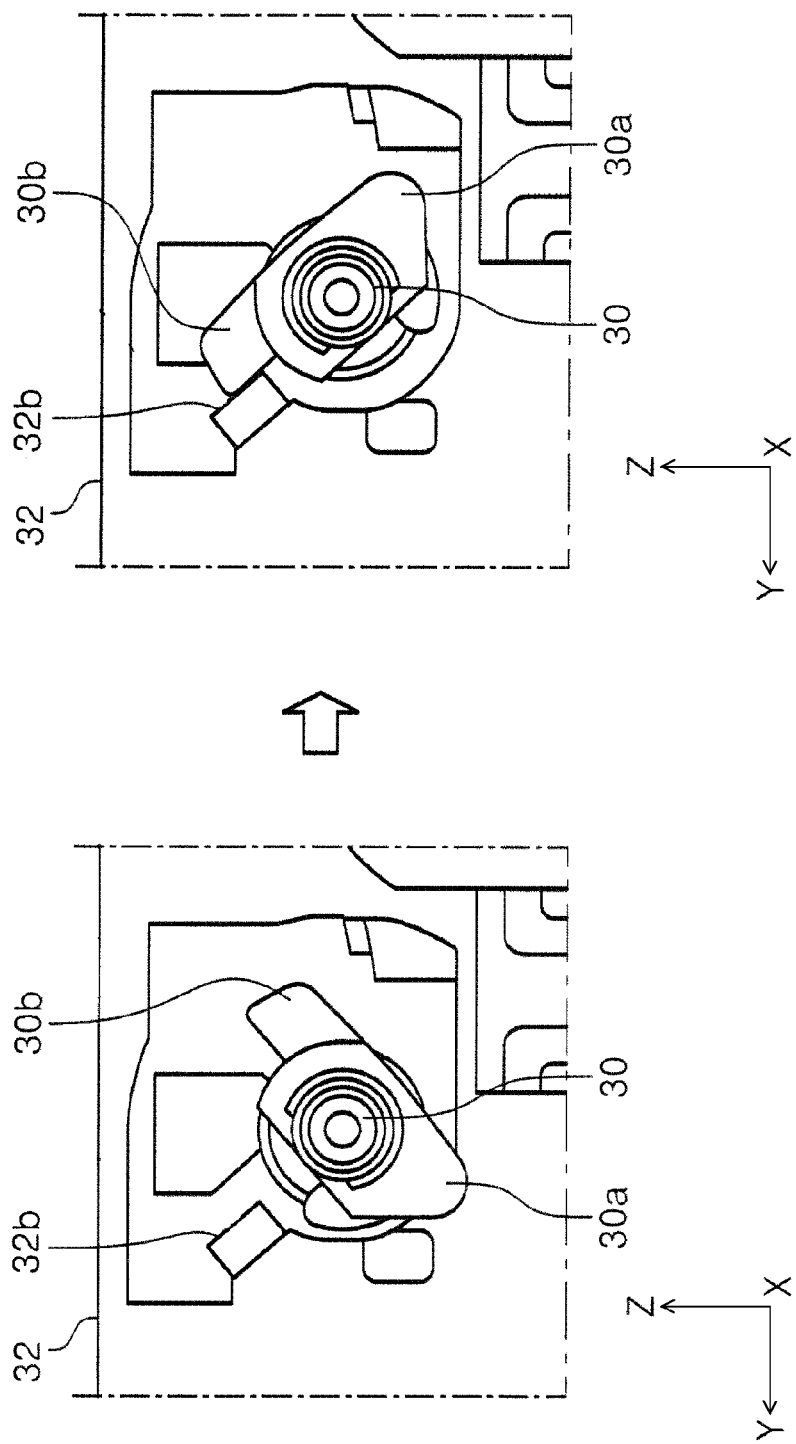
FIG. 19 is a front view of the contact portion provided in the rotation regulating member and the regulating portion that regulates rotation of the contact portion.

Further, the rotation regulating member 30 is provided with a contact portion 30b as illustrated in FIG. 19, and when the contact portion 30b contacts a regulating portion 32b provided on the guide member 32, the rotation of the shaft 27 in a state where the shaft 27 enters the holding portion 25e is stopped.

Further, the end portion of the rotation regulating member 30 in the +X direction enters a groove (not illustrated) formed in the guide member 32 (refer to FIGS. 3 and 4), and is guided by the guide member 32. The groove (not illustrated) extends in the circumferential direction around the rotation axis R (refer to FIG. 1), similarly to the groove 25a.

Next, a rib 25d is formed on the groove forming member 25 along the groove 25a as illustrated in FIGS. 5 and 6. The rib 25d extends in the circumferential direction around the rotation axis R (refer to FIG. 1), similarly to the groove 25a. The rib 25d, the rotation regulating member 30, and the spring 31 constitute a rotation regulator 29.

Figure 7:
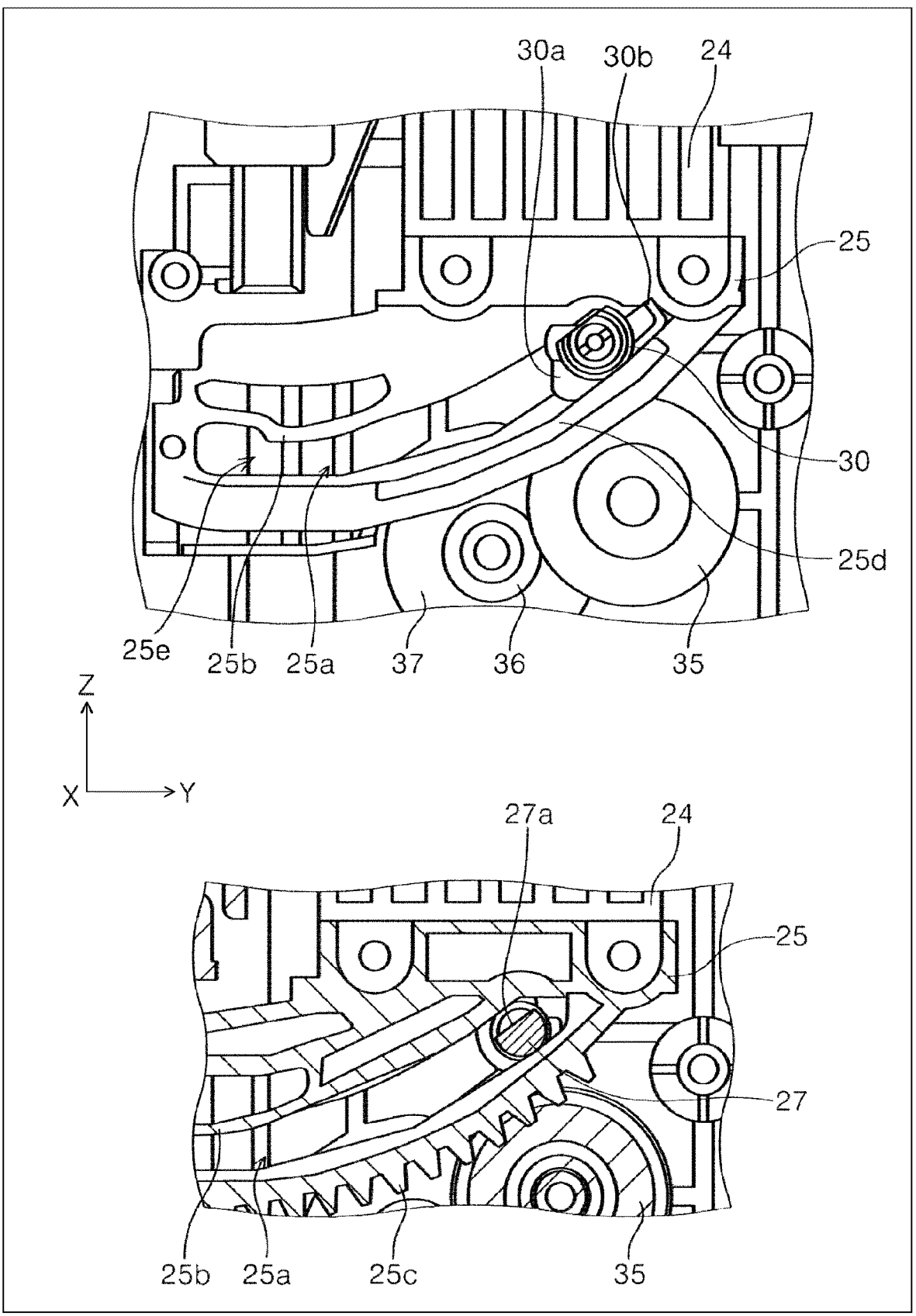
FIG. 7 has an upper diagram illustrating a front view of the groove forming member, and a lower diagram illustrating a sectional view of the groove forming member and a shaft.

When the scanner unit 4 is closed, the first regulating portion 30a of the rotation regulating member 30 contacts the rib 25d from above as illustrated in the upper diagram in FIG. 7. Thus, the shaft 27 is maintained in a state where a notch portion 27a faces the inner periphery of the groove 25a as illustrated in the lower diagram in FIG. 7 against the spring force of the spring 31 (refer to FIG. 5). This state is maintained until the rib 25d passes through the first regulating portion 30a in conjunction with the rotation of the scanner unit 4.

Figure 8:
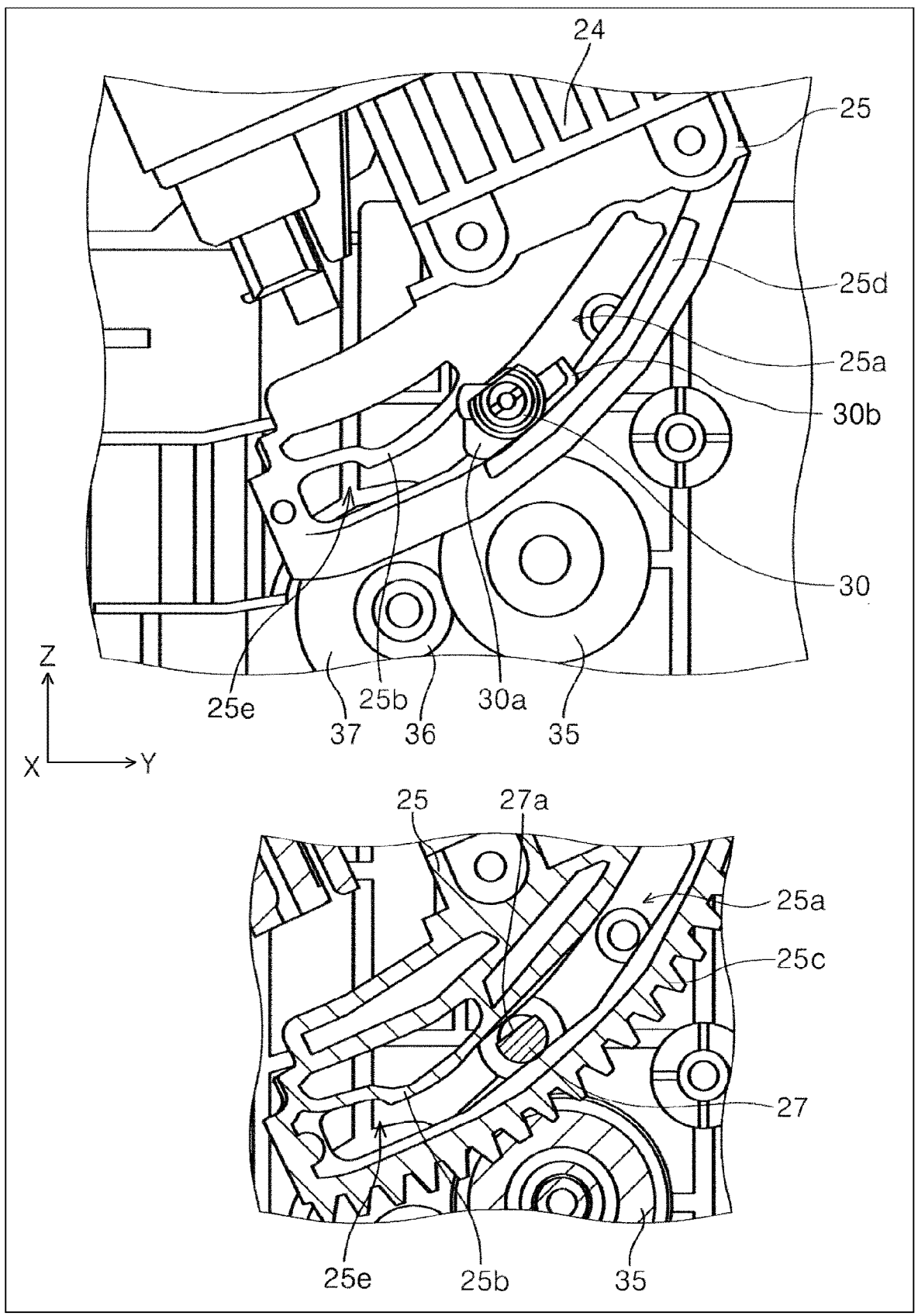
FIG. 8 has an upper diagram illustrating a front view of the groove forming member, and a lower diagram illustrating a sectional view of the groove forming member and the shaft.
Figure 9:
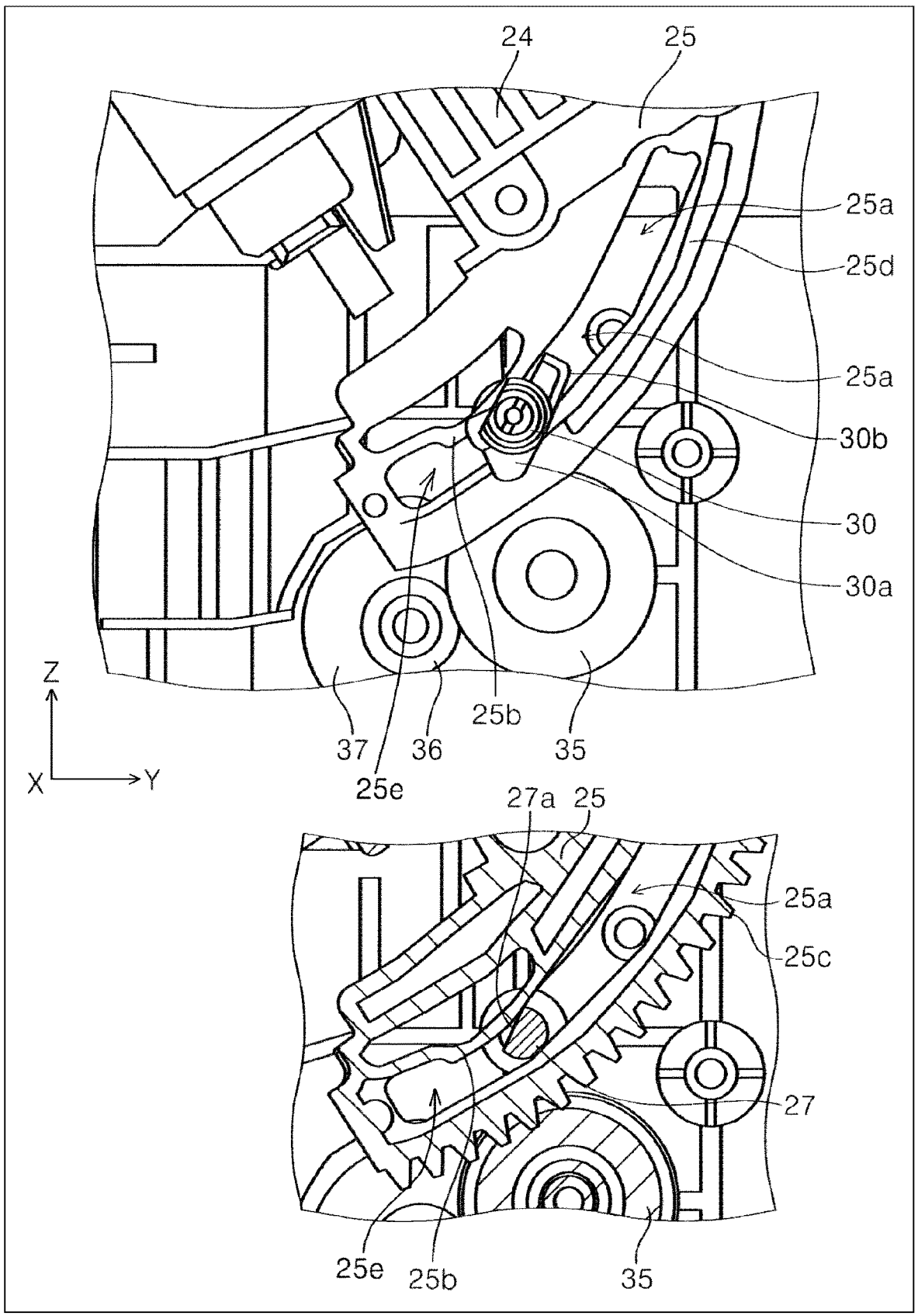
FIG. 9 has an upper diagram illustrating a front view of the groove forming member, and a lower diagram illustrating a sectional view of the groove forming member and the shaft.

From the state illustrated in FIG. 7 through the state illustrated in FIG. 8, when the rib 25d passes through the first regulating portion 30a as illustrated in FIG. 9 with the rotation of the scanner unit 4, the rotation regulating member 30, that is, the shaft 27 rotates counterclockwise in FIG. 9 with the spring force of the spring 31 (refer to FIG. 5).

Here, in FIG. 11, reference sign K1 denotes a range in which the elastically deformable portion 25b is formed, and, in the range in which the elastically deformable portion 25b is formed, the width of the groove 25a is shorter than the length of the chord of the notch portion 27a on the shaft 27. When the rib 25d passes through the first regulating portion 30a with the rotation of the scanner unit 4, the shaft 27 enters the formation range K1 of the elastically deformable portion 25b. Therefore, even if the rib 25d passes through the first regulating portion 30a with the rotation of the scanner unit 4, the rotation of the shaft 27 is regulated by the notch portion 27a hitting the inner periphery of the groove 25a, and the shaft 27 does not rotate until the state illustrated in FIG. 10. The formation range of the rib 25d and the formation range of the elastically deformable portion 25b are set so as to realize the above.

In other words, when closing the scanner unit 4 at a predetermined angle from a state in which the open state of the scanner unit 4 has been maintained (the state in FIG. 10) by the elastically deformable portion 25b being hooked on the shaft 27, the rib 25d is configured to come into contact with the rotation regulating member 30. With such a configuration, the elastically deformable portion 25b can be reliably hooked on the shaft 27, and the open state of the scanner unit 4 (the state illustrated in FIG. 10) can be reliably held.

Then, when the elastically deformable portion 25b passes through the shaft 27 in the process of opening the scanner unit 4 from the closed state, the rotation regulator 29 regulates the rotation of the shaft 27 such that the radial dimension of the shaft 27 with respect to the width of the groove 25a is equal to or less than a first dimension smaller than the maximum diameter. In the present embodiment, the first dimension is the same as the width of the groove 25a in the elastically deformable portion 25b, and is larger than the diameter d2 illustrated in FIG. 11.

Consequently, this reduces the load when the elastically deformable portion 25b passes through the shaft 27, and reduces the likelihood that the shaft 27, that is, the recording unit 2 will be lifted when opening the scanner unit 4.

In addition, the rotation regulator 29 includes the rotation regulating member 30 attached to the shaft 27, the rib 25d that is provided in the groove forming member 25 and that is configured to switch between a state in which the rib 25d contacts the rotation regulating member 30 and a state in which the rib 25d is separated from the rotation regulating member 30 with the pivoting of the scanner unit 4, and the spring 31 that applies a pressing force to the rotation regulating member 30 in a direction in which the radial dimension of the shaft 27 with respect to the width of the groove 25a in the elastically deformable portion 25b is larger than the first dimension.

When the rib 25d comes into contact with the rotation regulating member 30, the radial dimension of the shaft 27 with respect to the width of the groove 25a in the elastically deformable portion 25b is maintained at the first dimension or less against the pressing force of the spring 31 (state in FIG. 9). When the rib 25d is separated from the rotation regulating member 30, the shaft 27 is rotated by the pressing force of the spring 31, and the radial dimension of the shaft 27 with respect to the width of the groove 25a in the elastically deformable portion 25b becomes larger than the first dimension (state in FIG. 10).

With such a configuration, the rotation regulator 29 can be configured at a low cost.

Further, the rotation regulator 29 may have a configuration that includes a motor that rotates the shaft 27, an orientation detector that detects the orientation of the scanner unit 4, and a controller that controls the motor based on detection information of the orientation detector. That is, by performing control with the motive power of the motor such that the shaft 27 is not hooked on the elastically deformable portion 25b when opening the scanner unit 4, the likelihood that the shaft 27, that is, the recording unit 2, will be lifted is reduced when opening the scanner unit 4.

The shaft 27 and the groove forming member 25 described above are provided on the first hinge portion 21 (refer to FIGS. 2 and 3) in the X-axis direction. On the second hinge portion 22 side (refer to FIG. 12), a supporter 40 that supports the scanner unit 4 when the scanner unit 4 is in the open state is provided. The supporter 40 includes a support portion 42 provided on the recording unit 2 and a supported portion 41 provided on the scanner unit 4.

That is, in a configuration in which the configuration for holding the open state of the scanner unit 4 is provided only on the first hinge portion 21 side, the scanner unit 4 may descend on the second hinge portion 22 side; however, because the supporter 40 is provided on the second hinge portion 22 side, and the supported portion 41 is supported by the support portion 42 with the scanner unit 4 in an open state, it is possible to suppress the scanner unit 4 from descending below the second hinge portion 22.

Further, a free stop hinge that holds the open angle of the scanner unit 4 may be provided instead of or in addition to the supporter 40. In that case, it is preferable that the rotation resistance generated by the free stop hinge when closing the scanner unit 4 be smaller than the rotation resistance generated by the damper 38 (refer to FIGS. 5 and 6) on the first hinge portion 21 side.

Second Embodiment

Hereinafter, a second embodiment will be described with reference to FIGS. 15 to 20. Further, in FIGS. 15 to 20, the same components as those in the first embodiment are denoted by the same reference signs, and duplicate description will be omitted below.

Figure 15:
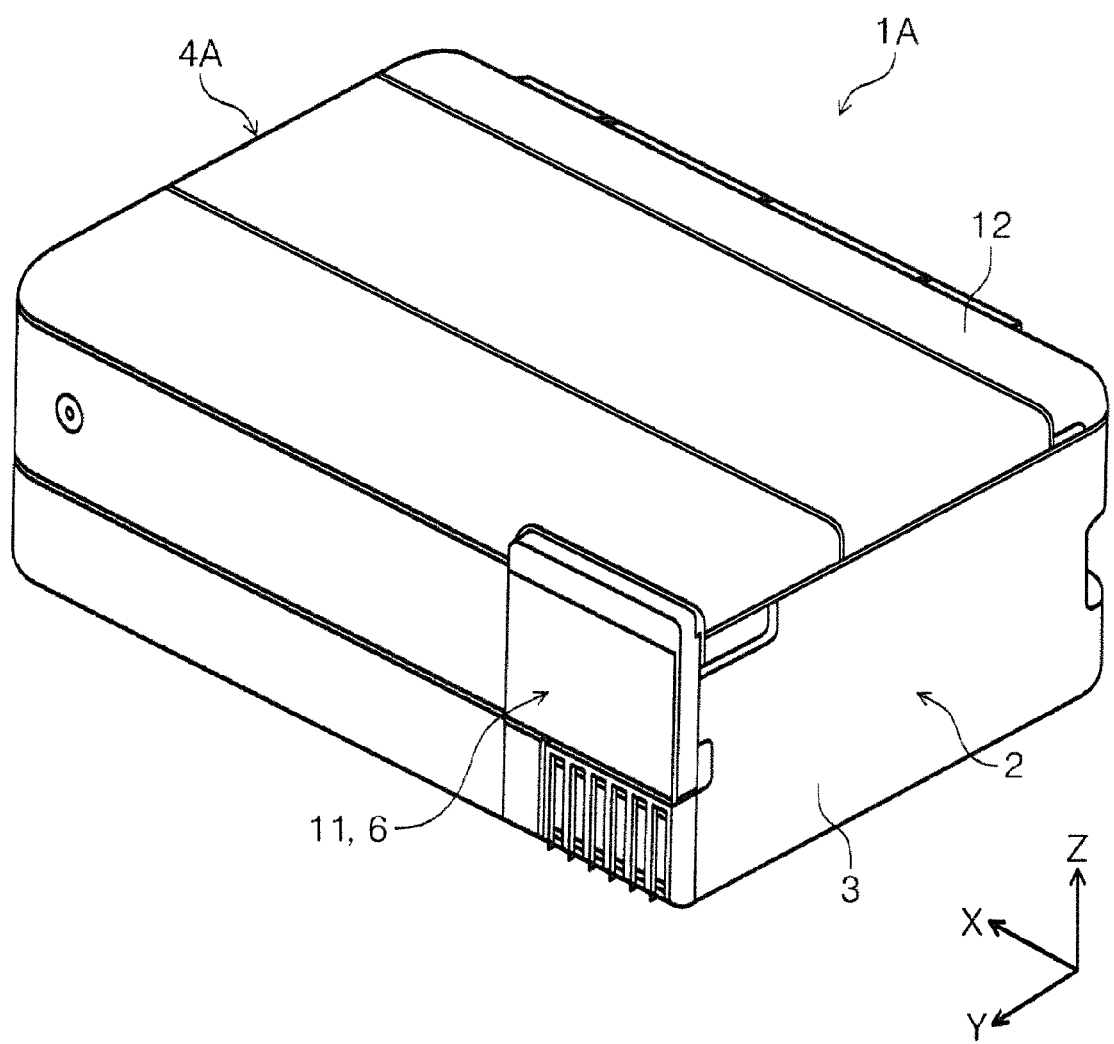
FIG. 15 is an external perspective view of a printer according to a second embodiment.
Figure 16:
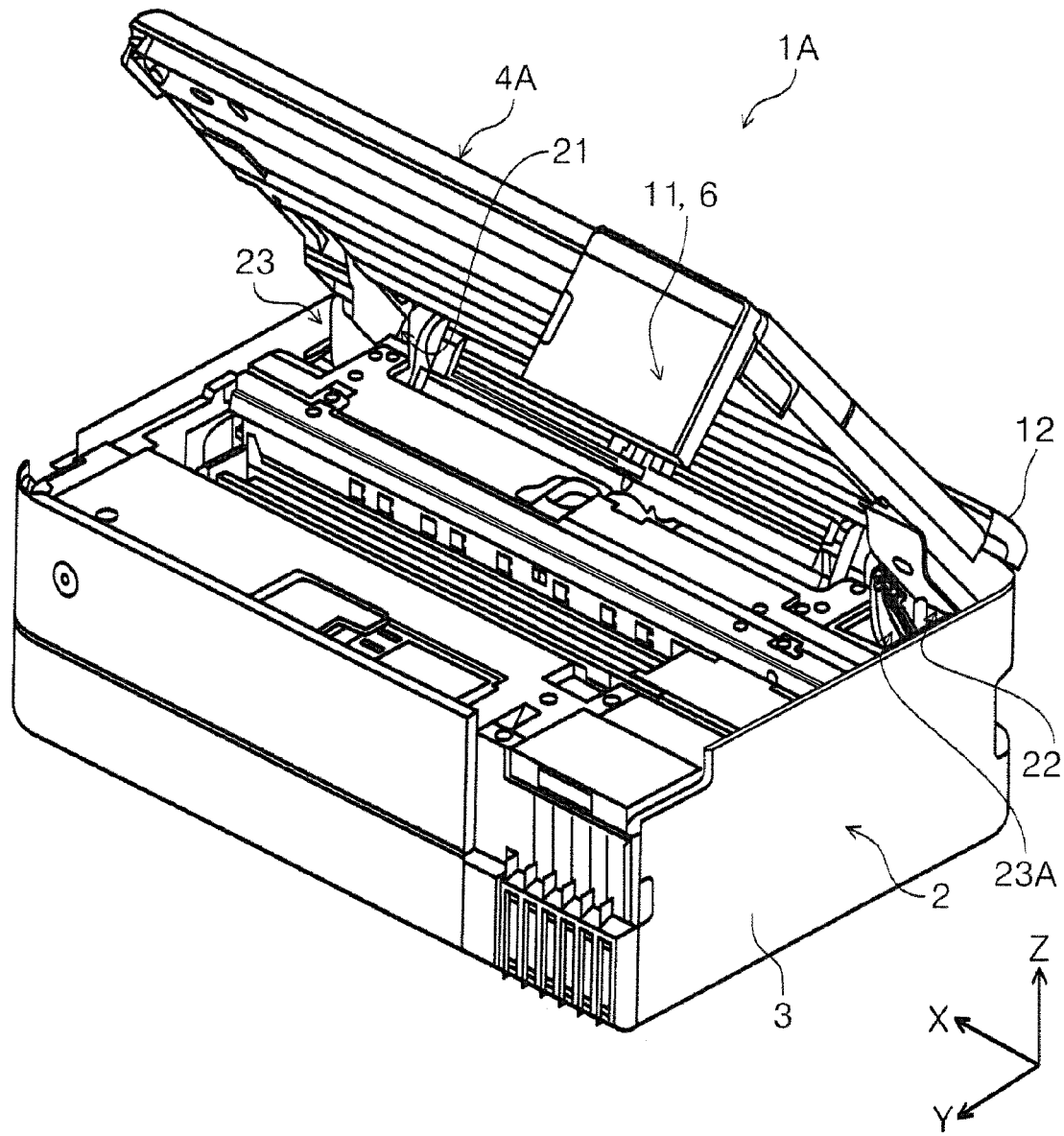
FIG. 16 is an external perspective view of the printer with a scanner unit in an open state.

In FIGS. 15 and 16, a printer 1A according to the second embodiment includes a scanner unit 4A as a document reading unit. The scanner unit 4A includes the panel unit 11 on the −X side in a direction of the rotation axis, that is, an X axis direction. The panel unit 11 includes the operation portion 6. Thus, the scanner unit 4A, when opened, has a configuration in which the −X direction side where the panel unit 11 is provided easily descends.

In the printer 1A, the holder 23 is provided on the first hinge portion 21 side, and a holder 23A is provided on the second hinge portion 22 side. Hereinafter, the holder 23 is referred to as a first holder 23, and the holder 23A is referred to as a second holder 23A. The first holder 23 has the same configuration as the holder 23 according to the above-described first embodiment, the second holder 23A is different from the first holder 23 in that the damper 38 is not provided, the shape of the groove into which the shaft 27 enters is slightly different, and a suppressor for suppressing a contact sound (described later) when the open state of the scanner unit 4A is held is provided. These differences will be further described later.

In the printer 1A, since holders are provided for both the first hinge portion 21 and the second hinge portion 22, when opening the scanner unit 4A, the descent of the scanner unit 4A on the first hinge portion 21 side or the second hinge portion 22 side can be suppressed.

Further, the holding force of each of the holders is determined by the magnitude of the elasticity of the elastically deformable portion 25b in a state where the shaft 27 has entered the holding portion 25e as illustrated in FIG. 10; however, this holding force may be set to be the same in the first holder 23 and the second holder 23A, or may be set to be different.

In addition, also in the printer 1A, similarly to the first embodiment described above, since the damper 38 is provided, even if the user releases his or her hand when closing the scanner unit 4A, the likelihood that the scanner unit 4A closes vigorously and a loud collision sound is generated and the scanner unit 4A is damaged can be reduced. Further, in the present embodiment, the damper 38 is provided for the first holder 23 on the first hinge portion 21 side; however, the damper 38 may be provided for the second holder 23A on the second hinge portion 22 side, or the damper 38 may be provided for both the first holder 23 and the second holder 23A. With provision of the dampers 38 in both the first holder 23 and the second holder 23A, when closing the scanner unit 4A, the scanner unit 4A can maintain the horizontal orientation.

Figure 18:
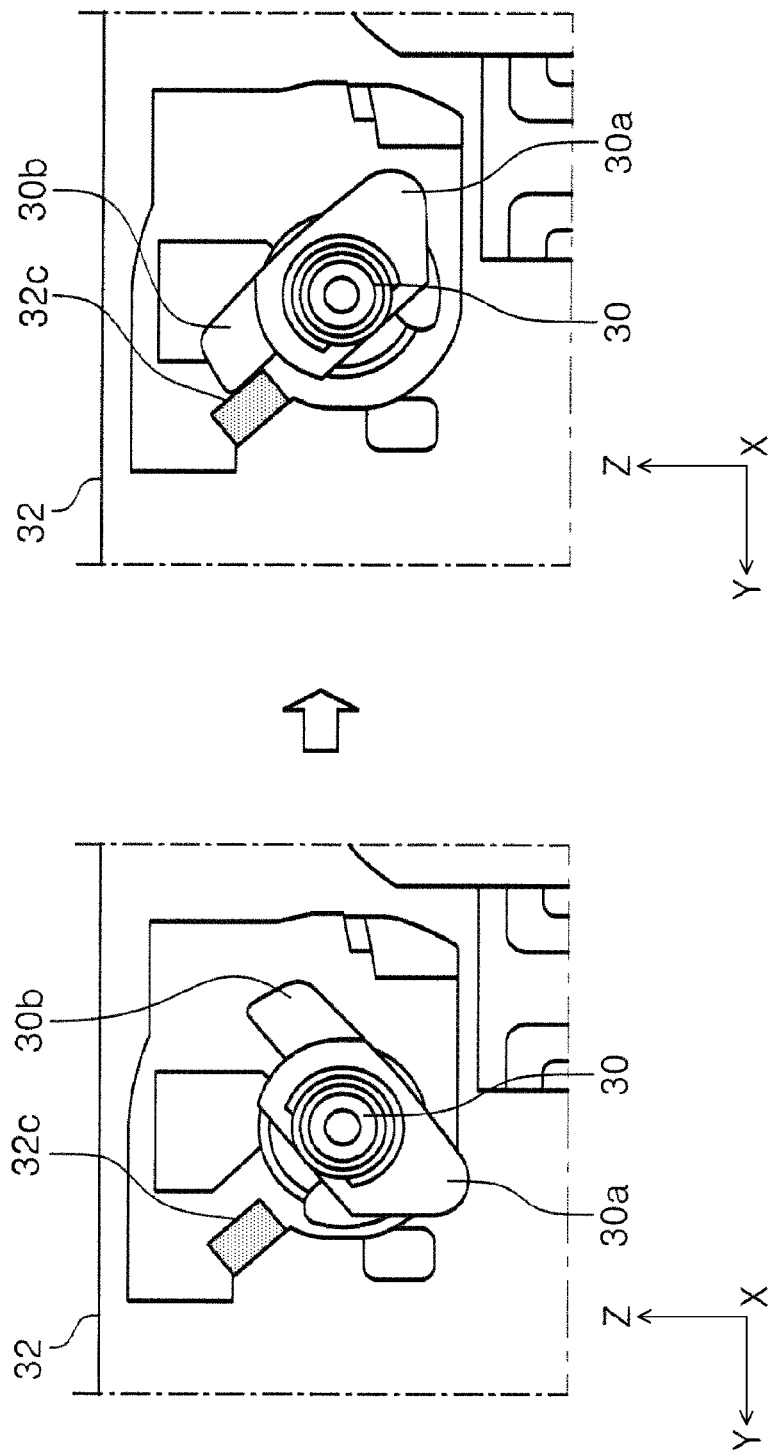
FIG. 18 is a front view of a contact portion provided in a rotation regulating member and a regulating portion that regulates rotation of the contact portion.

Subsequently, as illustrated in FIGS. 18 and 19, the rotation regulating member 30 is provided with the contact portion 30b, and when the contact portion 30b comes into contact with the regulating portion 32b (refer to FIG. 19) and a regulating portion 32c (refer to FIG. 18) provided on the guide member 32, the rotation of the shaft 27 is stopped in a state in which the shaft 27 has entered the holding portion 25e as illustrated in FIG. 10.

Here, FIG. 18 illustrates a state of the contact portion 30b and the regulating portion 32c in the second holder 23A, and FIG. 19 illustrates a state of the contact portion 30b and the regulating portion 32b in the first holder 23. The configuration illustrated in FIG. 19 is also employed in the first embodiment.

In FIG. 18, the regulating portion 32c of the second holder 23A is formed of an elastic material, unlike the regulating portion 32b of the first holder 23. The elastic material forming the regulating portion 32c is an elastic material such as rubber or sponge. That is, in the process of opening the scanner unit 4A, when the shaft 27 enters the holding portion 25e, the shaft 27, that is, the rotation regulating member 30, is rotated by the spring force of the spring 31 (refer to FIG. 5), and in the first holder 23, the contact portion 30b of the rotation regulating member 30 comes into contact with the regulating portion 32b and emits a contact sound. Further, the regulating portion 32b is formed integrally with the guide member 32, and is formed of a resin material in the present embodiment.

On the other hand, in the second holder 23A, the regulating portion 32c is formed of an elastic material so as to suppress the contact sound. The reason for this will be described later.

Figure 17:
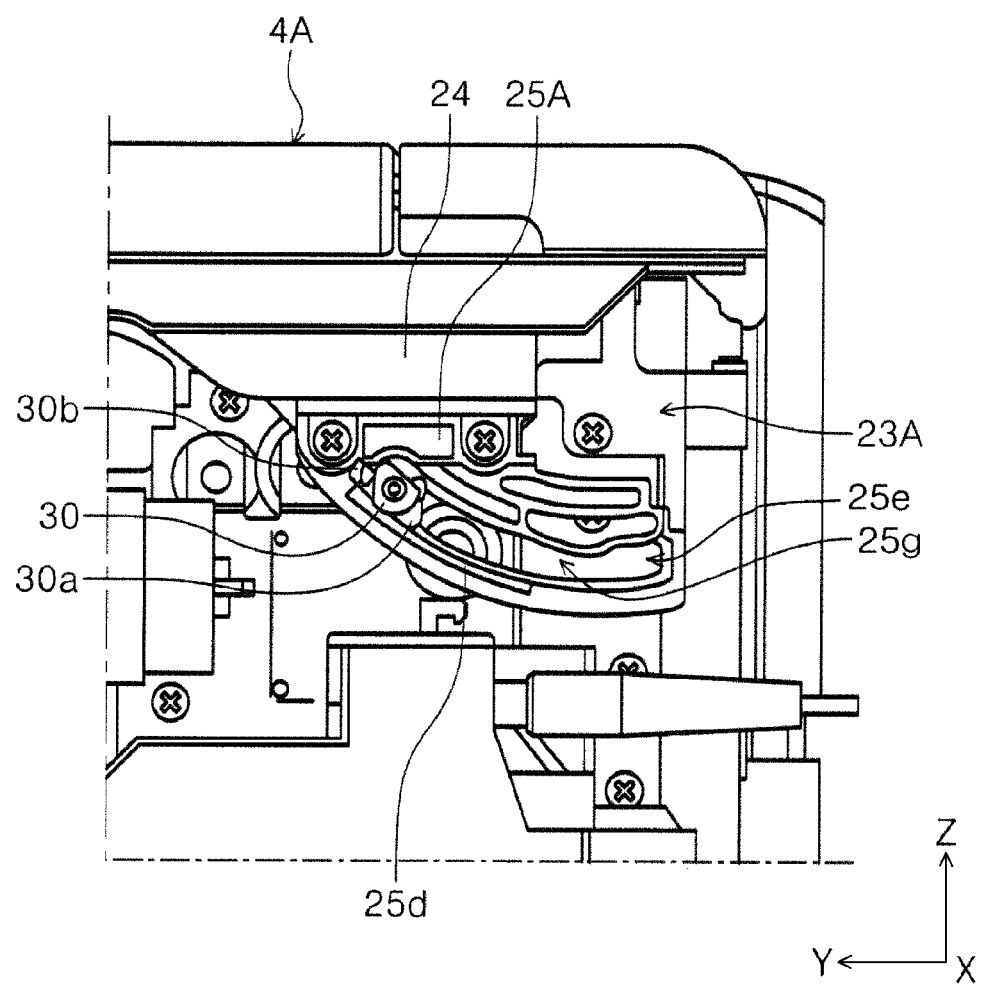
FIG. 17 is a front view of a groove forming member.

Subsequently, as illustrated in FIG. 17, the second holder 23A includes a groove forming member 25A, and a groove 25g is formed in the groove forming member 25A. The shape of the groove 25g is slightly different from the shape of a groove 25a in the first holder 23 (refer to FIGS. 7 to 11).

Hereinafter, the reason for this will be described. Further, hereinafter, the groove 25a will be referred to as a first groove 25a, and the groove 25g will referred to as a second groove 25g.

When the shaft 27 enters the holding portion 25e as described above, the contact portion 30b provided on the rotation regulating member 30 in the first holder 23 comes into contact with the regulating portion 32b, a contact sound is generated, and the user can determine that the scanner unit 4A is held in the open state due to the contact sound.

Here, in a case in which the contact sound is generated in the second holder 23A, when opening the scanner unit 4A, the timing at which the contact sound is generated in the first holder 23 and the timing at which the contact sound is generated in the second holder 23A may be shifted. In this case, the user stops the operation of opening the scanner unit 4A at the timing when a contact sound first occurs, as a result, there is a possibility that one of the first holder 23 and the second holder 23A cannot shift to the holding state, and in this case, there is a possibility that the scanner unit 4A may descend on the side that does not shift to the holding state. Further, the holding state indicates a state in which the shaft 27 has entered the holding portion 25e.

Figure 20:
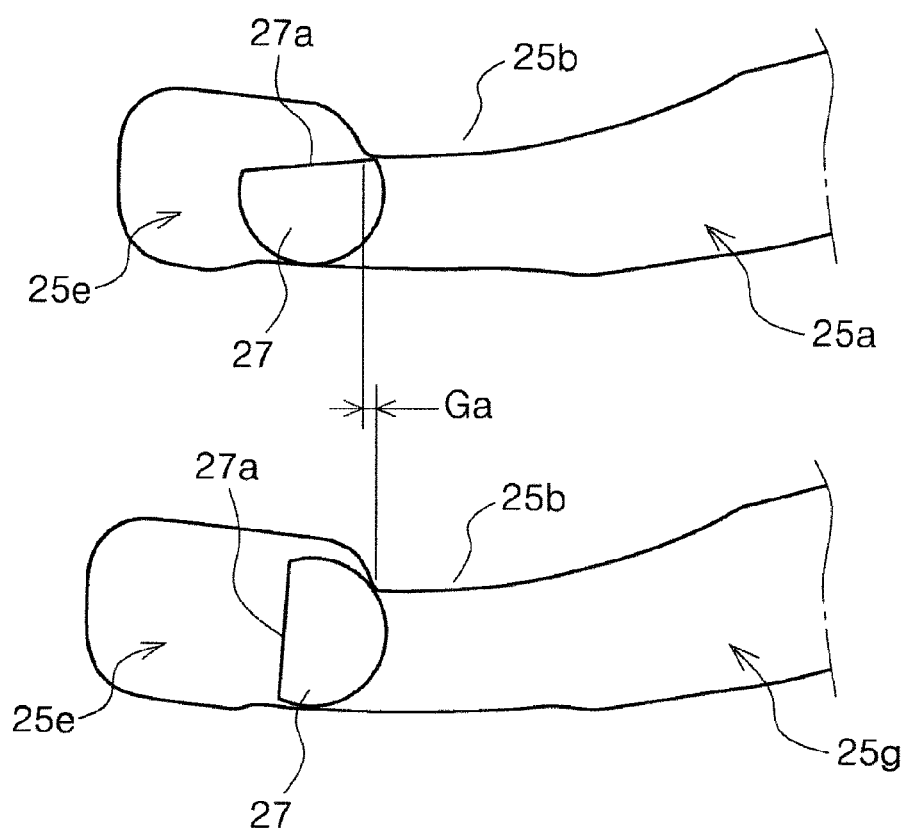
FIG. 20 is a diagram comparing the shapes of a first groove and a second groove.
Figure 21:
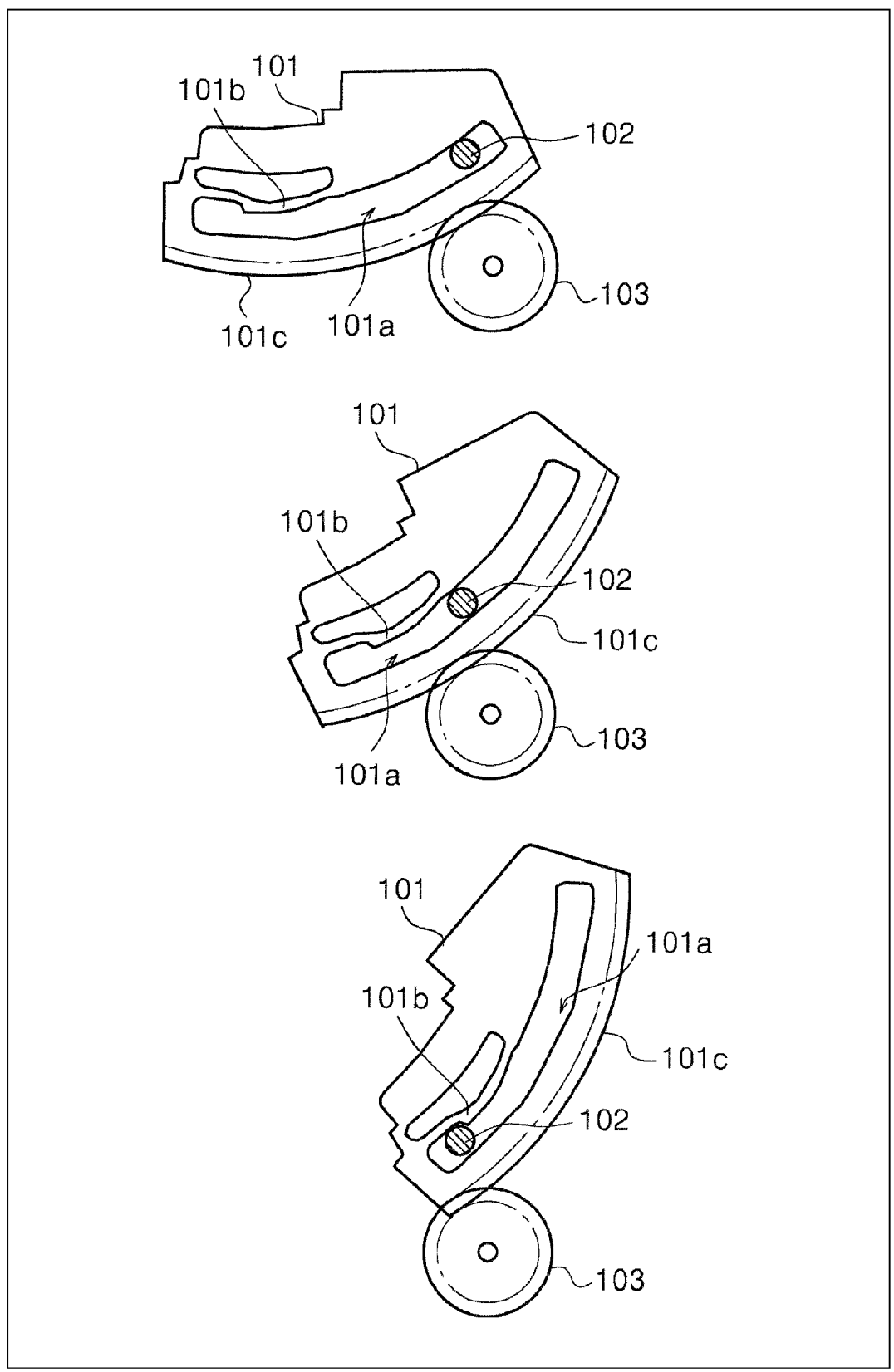
FIG. 21 illustrates an issue of the present disclosure.

In order to suppress such a problem, as illustrated in FIG. 20, the second groove 25g is set such that the position of the holding portion 25e is slightly shifted rightward in FIG. 20 by the distance Ga from the first groove 25a. As a result, when opening the scanner unit 4A, the timing at which the shaft 27 enters the holding portion 25e is earlier in the second groove 25g than in the first groove 25a, as illustrated in FIG. 20. That is, the timing at which the second holder 23A shifts to the holding state is earlier than the timing at which the first holder 23 shifts to the holding state. Further, in FIG. 20, for convenience of description, the orientations of the groove 25a and the groove 25g are changed.

Then, as described with reference to FIG. 18, out of the first holder 23 and the second holder 23A, the regulating portion 32c included in the second holder 23A is formed of an elastic material so as to reduce the contact sound. Therefore, because the contact sound is unlikely to be generated when the second holder 23A is in the holding state prior to the first holder 23, the user can be expected to continue the operation of opening the scanner unit 4A. When the first holder 23 is in the holding state, the contact sound is likely to be generated, and when the user stops the operation of opening the scanner unit 4A due to the contact sound, both the first holder 23 and the second holder 23A are in a holding state. As described above, it is possible to suppress the user from stopping the operation of opening the scanner unit 4A without shifting one of the first holder 23 and the second holder 23A to the holding state, and, as a result, both the first holder 23 and the second holder 23A can appropriately shift to the holding state.

In particular, in the present embodiment, the scanner unit 4A includes the panel unit 11 as an operation panel near the second hinge portion 22 in the rotation axis direction. For that reason, when opening the scanner unit 4A, the side on which the panel unit 11 is provided descends by weight, the first holder 23 is likely to be in a holding state prior to the second holder 23A, and this makes it easy to stop the operation of opening the scanner unit 4A without the second holder 23A shifting to the holding state. However, as described above, because the second holder 23A is first to enter the holding state, and at that time, the contact sound is unlikely to be generated, it is possible to suppress the operation of opening the scanner unit 4A from being stopped without the second holder 23A shifting to the holding state.

Further, a weight may be provided on the side opposite to the side on which the panel unit 11 is provided in the direction of the rotation axis to balance the weight in the direction of the rotation axis.

It goes without saying that the present disclosure is not limited to the above embodiment, and various modifications are possible within the scope of the disclosure described in the claims, and they are also included in the scope of the present disclosure.

For example, in the above embodiment, the groove forming member 25 is provided in the scanner unit 4 and the shaft 27 is provided in the recording unit 2; however, on the contrary, the shaft 27 may be provided on the scanner unit 4 and the groove forming member 25 may be provided on the recording unit 2. That is, any configuration may be used as long as the shaft 27 relatively moves within the groove 25a. This is the same not only in the first embodiment but also in the second embodiment.

In addition, in each embodiment, the elastically deformable portion 25b of the groove forming member 25 is configured to elastically deform by the elasticity of the groove forming member 25 itself; however, instead of this, a member that elastically deforms, such as a compression spring or a leaf spring, may be used. In addition, the shaft 27 is a metal shaft, but may be a resin shaft.

In addition, in the above-described embodiments, the configuration is such that the radial dimension changes with rotation of the shaft 27; however, as illustrated in FIG. 14, the configuration may be such that the diameter changes relative to the groove 25a through movement in the axis direction. In FIG. 14, reference sign 28 denotes a shaft according to another embodiment, which is provided in the recording unit 2. The shaft 28 is inserted into the groove 25a and is slidably provided in the vertical direction in FIG. 14, that is, in the X-axis direction. The distal end of the shaft 28 is in contact with a guide member 34, and the shaft 28 is pressed toward the guide member 34 by a spring (not illustrated). The guide member 34 is a modification of the guide member 32 illustrated in FIG. 3.

Cam surfaces 34a, 34b, and 34c are formed in the guide member 34, and, with the opening and closing of the scanner unit 4, the distal end of the shaft 28 moves from the cam surface 34a to the cam surface 34c, or moves from the cam surface 34c to the cam surface 34a.

A large-diameter portion 28a and a small-diameter portion 28b are formed in the shaft 28, and, in the upper diagram in FIG. 14, the distal end of the shaft 28 is in contact with the cam surface 34a, and the large-diameter portion 28a faces the groove 25a. This state corresponds to the state illustrated in FIG. 10.

In addition, in the lower diagram in FIG. 14, the distal end of the shaft 28 is in contact with the cam surface 34c, and the small-diameter portion 28b faces the groove 25a. This state corresponds to the states illustrated in FIG. 7, FIG. 8, and FIG. 9.

With such a configuration, the same operation and effect as in the above-described embodiment can be obtained.

In addition, in each of the above embodiments, the opening/closing structure is applied to the scanner unit 4 which is an example of the opening/closing body; however, for example, in an image reading apparatus including a scanner body and a document transport apparatus that transports a document to a scanner, the present disclosure can also be applied to a configuration in which the document transport apparatus is the opening/closing body and the document transport apparatus is opened and closed with respect to the scanner main body.

Alternatively, the present disclosure can be applied to an opening/closing apparatus including an apparatus main body and an opening/closing body.

Specifically, the opening/closing apparatus includes the apparatus main body, and the opening/closing body that opens and closes an upper portion of the apparatus main body by pivoting at the upper portion of the apparatus main body. The apparatus main body is provided with a shaft, and the opening/closing body is provided with a groove forming member, in which a groove into which the shaft is inserted and to which the shaft moves relatively with opening and closing of the opening/closing body is formed, the groove is provided with an elastically deformable portion configured to make the width of the groove narrower than a maximum diameter of the shaft and configured to elastically deform in a direction in which the width of the groove increases, and the open state of the opening/closing body is held by the elastically deformable portion being hooked on the shaft. The shaft has a shape whose radial dimension changes along the circumferential direction and is provided so as to rotate. The opening/closing apparatus includes a rotation regulator that regulates rotation of the shaft such that a radial dimension of the shaft with respect to a width of the groove is a first dimension smaller than the maximum dimension when the elastically deformable portion passes through the shaft in the process of opening from the closed state of the opening/closing body. Consequently, when opening the opening/closing body, the load when the elastically deformable portion passes through the shaft is reduced or eliminated, and the likelihood that the shaft, that is, the apparatus main body, is lifted when the opening/closing body is opened without the load is reduced.

What is claimed is:

1. A recording apparatus comprising:
   a recording unit comprising an apparatus main body that includes a recording head that performs recording on a medium;
   a document reading unit comprising a document scanner that includes a reading sensor that reads a document and that opens and closes an upper portion of the recording unit by pivoting at an upper portion of the recording unit; and
   a holder that holds the document reading unit in an open state, wherein
   the holder includes a shaft provided on one of the recording unit and the document reading unit, and a groove forming member provided on another one of the recording unit and the document reading unit,
   in the groove forming member, a groove into which the shaft is inserted is formed, and the shaft moves relative to the groove with opening and closing of the document reading unit,
   in the groove, an elastically deformable portion configured to make a width of the groove narrower than a maximum diameter of the shaft and configured to elastically deform in a direction in which the width of the groove increases, and a holding portion that holds the document reading unit in an open state by holding the shaft by elasticity of the elastically deformable portion are provided,
   the shaft has a shape whose radial dimension changes along a circumferential direction and is provided so as to rotate, and
   the recording apparatus includes a rotation regulator that regulates rotation of the shaft such that the radial dimension of the shaft with respect to the width of the groove is equal to or less than a first dimension that is smaller than the maximum diameter when the shaft passes through the elastically deformable portion in a process of opening the document reading unit from a closed state, wherein the rotation regulator includes:

a rotation regulating member attached to the shaft, a rib that is provided on the groove forming member and that switches between a state in which the rib is in contact with the rotation regulating member and a state in which the rib is separated from the rotation regulating member with the pivoting of the document reading unit, and a spring that applies a pressing force to the rotation regulating member in a direction in which the radial dimension of the shaft with respect to the width of the groove in the elastically deformable portion is larger than the first dimension, when the rib is in contact with the rotation regulating member, the radial dimension of the shaft with respect to the width of the groove in the elastically deformable portion is maintained at the first dimension or less against the pressing force of the spring, and when the rib is separated from the rotation regulating member, the shaft is rotated by the pressing force of the spring, and the radial dimension of the shaft with respect to the width of the groove in the elastically deformable portion is larger than the first dimension.

2. The recording apparatus according to claim 1, wherein the rib comes into contact with the rotation regulating member with closing of the document reading unit at a predetermined angle from a state in which the shaft is held by the holding portion.

3. The recording apparatus according to claim 1, wherein the shaft has a shape in which a portion of a circumference is cut out when viewed from an axis direction, and the radial dimension changes along the circumferential direction.

4. The recording apparatus according to claim 1, wherein the document reading unit is provided on the recording unit via a first hinge portion provided at one side end portion of the document reading unit and a second hinge portion provided at another side end portion of the document reading unit in a rotation axis direction, the shaft, the groove forming member, and the rotation regulator are provided on a side of the first hinge portion in the rotation axis direction, and a supporter structure that supports the document reading unit in a state where the document reading unit is open is provided on a side of the second hinge portion in the rotation axis direction.

5. The recording apparatus according to claim 1, wherein the document reading unit is provided on the recording unit via a first hinge portion provided at one side end portion of the document reading unit and a second hinge portion provided at another side end portion of the document reading unit in a rotation axis direction, a first holder is provided on a side of the first hinge portion as the holder, and a second holder is provided on a side of the second hinge portion as the holder.

6. The recording apparatus according to claim 5, wherein at least one of the first holder and the second holder is provided with a damper that attenuates a speed at which the document reading unit closes.

7. The recording apparatus according to claim 5, wherein the holder includes a contact portion provided on the rotation regulating member, and a regulating portion that regulates rotation of the rotation regulating member upon contact with the contact portion, and, in a state in which the shaft entered the holding portion, the contact portion is pressed against the regulating portion by the pressing force of the spring, in the groove forming member included in the first holder, a first groove is formed as the groove, in the groove forming member included in the second holder, a second groove is formed as the groove, and when opening the document reading unit, a timing at which the shaft enters the holding portion formed in the second groove is earlier than a timing at which the shaft enters the holding portion formed in the first groove, and out of the first holder and the second holder, the regulating portion provided in the second holder is formed of an elastic material that reduces a contact sound upon contact with the contact portion.

8. The recording apparatus according to claim 7, wherein the document reading unit includes an operation panel near the second hinge portion in the rotation axis direction.

9. An opening/closing apparatus comprising:

an apparatus main body;

an opening/closing body that opens and closes an upper portion of the apparatus main body by pivoting at an upper portion of the apparatus main body; and a holder that holds the opening/closing body in an open state, wherein the holder includes a shaft provided on one of the apparatus main body and the opening/closing body, and a groove forming member provided on another one of the apparatus main body and the opening/closing body, in the groove forming member, a groove into which the shaft is inserted is formed, and the shaft moves relative to the groove with opening and closing of the opening/closing body, in the groove, an elastically deformable portion configured to make a width of the groove narrower than a maximum diameter of the shaft and configured to elastically deform in a direction in which the width of the groove increases, and a holding portion that holds the opening/closing body in an open state by holding the shaft by elasticity of the elastically deformable portion are provided, the shaft has a shape whose radial dimension changes along a circumferential direction and is provided so as to rotate, and the opening/closing apparatus includes a rotation regulator that regulates rotation of the shaft such that the radial dimension of the shaft with respect to the width of the groove is equal to or less than a first dimension smaller than the maximum diameter when the shaft passes through the elastically deformable portion in a process of opening the opening/closing body from a closed state, wherein the rotation regulator includes:

a rotation regulating member attached to the shaft, a rib that is provided on the groove forming member and that switches between a state in which the rib is in contact with the rotation regulating member and a state in which the rib is separated from the rotation regulating member with the pivoting of the opening/closing body, and a spring that applies a pressing force to the rotation regulating member in a direction in which the radial dimension of the shaft with respect to the width of the groove in the elastically deformable portion is larger than the first dimension, when the rib is in contact with the rotation regulating member, the radial dimension of the shaft with respect to the width of the groove in the elastically deformable portion is maintained at the first dimension or less against the pressing force of the spring, and when the rib is separated from the rotation regulating member, the shaft is rotated by the pressing force of the spring, and the radial dimension of the shaft with respect to the width of the groove in the elastically deformable portion is larger than the first dimension.

* * * * *